US011443648B2

(12) United States Patent
Brinton et al.

(10) Patent No.: US 11,443,648 B2
(45) Date of Patent: Sep. 13, 2022

(54) SYSTEMS AND METHODS TO ASSIST AN INSTRUCTOR OF A COURSE

(71) Applicant: Zoomi, Inc., Malvern, PA (US)

(72) Inventors: Christopher Greg Brinton, West Lafayette, IN (US); Mung Chiang, West Lafayette, IN (US); Sangtae Ha, Superior, CO (US); William D. Ju, Mendham, NJ (US); Stefan Rudiger Rill, Augsburg (DE); James Craig Walker, Chester Springs, PA (US); Elizabeth Tenorio, Salem, NH (US)

(73) Assignee: Zoomi, Inc., Malvern, PA (US)

( * ) Notice: Subject to any disclaimer, the term of this patent is extended or adjusted under 35 U.S.C. 154(b) by 0 days.

(21) Appl. No.: 17/029,707

(22) Filed: Sep. 23, 2020

(65) Prior Publication Data

US 2021/0049923 A1 Feb. 18, 2021

Related U.S. Application Data

(63) Continuation of application No. 14/712,108, filed on May 14, 2015.

(60) Provisional application No. 62/041,655, filed on Aug. 26, 2014.

(51) Int. Cl.
G09B 7/00 (2006.01)
G09B 5/02 (2006.01)

(52) U.S. Cl.
CPC ............ *G09B 7/00* (2013.01); *G09B 5/02* (2013.01)

(58) Field of Classification Search
CPC ... G09B 7/00; G09B 5/02; G09B 5/06; G09B 5/08; G09B 5/04
See application file for complete search history.

(56) References Cited

U.S. PATENT DOCUMENTS

| 5,539,893 | A  | * | 7/1996  | Thompson | G06F 12/0897 711/117 |
| 2002/0138456 | A1 | * | 9/2002  | Levy | G06Q 30/02 706/25 |
| 2002/0182573 | A1 | * | 12/2002 | Watson | G09B 19/00 434/236 |
| 2012/0276516 | A1 | * | 11/2012 | Teskey | G09B 7/00 434/362 |
| 2012/0310961 | A1 | * | 12/2012 | Callison | G06F 16/2379 707/756 |
| 2014/0335497 | A1 | * | 11/2014 | Gal | G09B 5/08 434/323 |

* cited by examiner

*Primary Examiner* — Eddy Saint-Vil
(74) *Attorney, Agent, or Firm* — Gottlieb Rackman & Reisman PC

(57) ABSTRACT

A system and method for delivery of an online course, customized to a student based on captured student's actions in interacting with the course is disclosed. The actions are compared to actions of others, where the actions of others are correlated with known learning results. In part, such comparison involves tagged content and the tagging process is also a part of the present invention.

20 Claims, 12 Drawing Sheets

SYSTEMS AND METHODS TO ASSIST AN INSTRUCTOR OF A COURSE

CROSS-REFERENCE TO RELATED APPLICATION(S)

The present application is a continuation-in-part of U.S. patent application Ser. No. 14/712,108, filed on May 14, 2015, now pending and U.S. Provisional Patent Application No. 62/041,655 filed on Aug. 26, 2014, also incorporated by reference.

TECHNICAL FIELD OF THE INVENTION

This disclosure generally relates to software systems and more specifically to software systems that deliver learning content to students electronically.

BACKGROUND OF THE INVENTION

Electronic Learning (eLearning) systems are widely used to deliver online learning and education. Increasingly, eLearning systems employ individualization methods to customize the learning experience in an attempt to improve learning outcomes. However, individualization in the prior art is a manual labor-intensive effort that requires significant input from the content provider and/or course author beyond the initial creation of the course, such as manually tagging content and defining logical rules that will execute adaptation. Typically, course authors need to at least provide parameters for the transition logic, which can be rather cumbersome and time consuming. Additionally, new types of behavioral data collected about students in eLearning courses—including the clicks they make on videos, the time they spend taking assessments, the text posts that they make on discussion forums, and other measurements—present novel opportunity to define more effective individualization based on learner performance, behavior, and content, but also run the risk of making the authoring and teaching processes even more complex given the manual-intensive components of the prior art.

Hence, it is desirable to design methods and systems that can automate the processes of tagging content and defining individualization decisions based on these tags, using both behavior and performance among the inputs.

SUMMARY OF THE INVENTION

The present invention is directed to a method to optimize learning efficacy and efficiency in online courses. In particular, the present invention is directed to methods to, at least educationally, customize a collection of content comprising a course and to individualize or adapt its sequence of delivery for a particular student, even as the course is being delivered, in a way that does not necessitate upfront burdensome input from an instructor/author or any other human. The present invention is further directed to selection of material from the collection which is better attuned to the student's understood comprehension and/or preferred learning style, determined typically during the course. The present invention is also directed to a system to implement said customization and individualization methods.

In a standard eLearning course, an instructor or author prepares course materials and defines a linear flow of these materials together with quizzes and exams interspersed, including grading criteria. Quiz and exam results may then be used by an instructor to "pause" the course for a particular student who obtains low scores so that he/she can provide the student with remedial help when the results are poor. While the present method is also directed to a generally linear flow of delivered materials, the present invention further tracks a learner's behavior, actions, and/or performance as he/she interacts with those materials, analyzes these interactions even before a quiz or exam is offered, and makes corresponding individualized adjustments in course delivery. In the present invention, individualized adaptation is based on this student's interaction while the student is in the midst of the course. Note that the present invention also applies to cases in which the course itself already has logic in place to adapt based on user behavior; the individualization created by the present invention can be applied on top of, or supplementary to, such existing adaptation logic.

The term "behavior" is used herein to describe an action or a set of actions exhibited by a student that may either positively or negatively be associated with learning outcomes in a statistical sense. That is, in the present invention, student actions are identified, captured, and recorded as they happen, where these actions include, as an example, mouse clicks and movements, and possibly physical actions and movements, such as but not limited to eye movements. Time of and/or between actions is also identified, captured, and recorded (either directly or indirectly). Behaviors are determined by processing "measurements" collected about a student while the student is interacting with the course material, preferably aggregated so as to determine indicators of performance and/or preference. Examples of behaviors include low engagement, speeding, and high completion. Examples of measurements which constitute these behaviors include pausing, opening a file, and rewinding in a video and can include mouse clicks, body actions, and the like. Behaviors are used to model a student, compare the student to one or more other students, or compare the student to the same student's behaviors in prior courses, or both, and adjust course delivery based, at least in part, on known success approaches for different behaviors.

The individualization process of the present invention preferably involves computer learning or artificial intelligence. Any individualization process, whether established by a human or by artificial intelligence, consists of three fundamental steps in the present invention: Content Tagging, User Modeling, and Path Switching. There is typically a relationship between the latter two steps, with the method of User Modeling affecting Path Switching, and vice versa. Differences in individualization methods can be traced to the level of sophistication and novelty contained in each of these steps.

For the purpose of this application, one can think of a course divided into Modules, each Module serving to include all learning material for at least one portion of the course such as a syllabus topic or sub-topic. A Module is formed of one or more Files, each File being of one or more types of content medium, such as video, images, or text, and including at least some portion of a representation of requisite content for a Module. Files are in turn comprised of one or more Segments, which are parsed and defined based on the File type. For example, in a video File, each Segment may be a 20 second chunk of the video content, while for a text File, each Segment may be a separate paragraph. A Module may have a plurality of options for File delivery, and each File may be comprised of any combination of Segments with the requirement that the combined Segments are of the same file type. As an example, a Module may have a math-intensive text File made up of text Segments A, B, and C and may have a remedial video File made up of video Segments B, D, E, F, and G. Files may have educational content, assessments, or some combination.

In the present invention, content is delivered to the student electronically, such as over an internet connection. The student uses an internet-friendly device, such as a personal computer, tablet, or smart phone, which may have an app and/or a graphical user interface (GUI) on which the student views and interacts with the content. The content may progress based on student actions, such as the student tapping an on-screen arrow or rolling a mouse. The app, GUI, or webpage of the present invention is interactive in that it captures the student's actions and also may activate other features of the receiving device, such as a camera, to record other than mouse clicks. The display of the GUI of the present invention may be reconfigured based on the student's actions; that is, the GUI may have icons or sub-screens which are rearranged based on determined student preferences.

The purpose of Content Tagging, at a high level, is to specify where course topics and/or keywords appear within content Files and Segments. In the present invention, content in content-based Files can be textual, audible, and/or visual, such as in a video or in an animation or even in a still image. One possible, but undesirable, way of performing Content Tagging is to have the course instructor manually specify which topics appear in which Files and in which Segments. Regardless, there may be a need to understand which items should be tagged, and this may vary by, for example, course topic (math vs. English could have different items of importance), and may be achieved in the present invention manually or by running automated means which could vary by subject matter. In a preferred embodiment of the present invention, Content Tagging instead preferably at least incorporates a Natural Language Processing (NLP) method, said method processing content so as to extract the key course topics and their locations within the content Files. The topics may be determined based on a syllabus or other course summary or overview. In a PDF File, for example, this extraction might indicate a set of topics for each paragraph in the File. For audio or image Files, the text input for an NLP method may be extracted through open-source Speech-To-Text conversion or Optical Character Recognition (OCR) tools, respectively. Additional key course topics may also be extracted from a document, such as a course syllabus or outline, and then associated with each File or Segment based on for example their frequency of occurrence. In summary, in the present invention, each File is tagged with associated key course topics and their locations in the file.

A general sequence of content Files in the course is established based on the syllabus (or equivalent) in the first place, or some other determinable logical flow. In a preferred embodiment, the course syllabus is provided by way of the course author and the syllabus is used by the present invention to define the sequence of Modules, the sequence of Files within each Module, and the sequence of Segments within each File. In cases where this structure is not defined, course content may be provided which is then analyzed using NLP and sequenced based upon the content topic breakdown. In this way, a course may provide as much or as little structure as is needed, with reliance on the topic analysis to determine an appropriate sequencing where structure is not defined. In at least some cases, there may be a plurality of Modules, Segments, and/or Files covering the same topic but done in different ways or difference media types (as examples of differences).

Further, there may be more than one file/Segment addressing certain topics, such as directed to different types of learners (e.g., textual vs. visual).

The final output of Content Tagging is an association of each Segment or File with its constituent topics. In an embodiment, this association will be specified as a probability distribution for each Segment, with each number in the distribution expressing the amount of a particular topic comprising the Segment. User Modeling and Path Switching can then be accomplished on a topic-by-topic basis.

The purposes of User Modeling, at a high level, is (1) estimating a student's knowledge state and/or content preferences with respect to each topic as the student proceeds through the course, while (2) determining whether Path Switching is needed. That is, there exists (or the system creates) a user model for each student. The model is prepared and updated through analysis of all or a subset of the behaviors the student exhibits, derived both from their measurements generated on the course material and their performance on the assessments pertaining to each topic, both within the currently shown content Files as well as Files shown previously. The model is intended at least in part to be a formulated understanding of the student's skills, comprehension, and/or understanding of the course material, as well as the student's presentation preferences. As the student progresses through the course, the student's mastery of the subject matter and preferences are tracked by the user model, which evolves with more data, indicating topics needing further instruction or remediation, and presentation preferences. As a simple example, answering a test question correctly could signify an increase in content knowledge on the corresponding topic. As another example, exhibiting high engagement in a certain File of a Module may be interpreted as an increase in preference for this content type (e.g., video vs. text) in explaining the topics that are covered by this File.

More generally, the present invention recognizes or invokes specific behavioral sequences, called "motifs", identified through artificial intelligence methods, to update each student's user model. These motifs are sequences of behavioral actions, generally reoccurring, that have been a priori correlated with increases/decreases in knowledge state and/or increases/decreases in content preferences. In at least one example, the correlation is with respect to likelihood of correct on first attempt for questions such as test questions. The set or sequence of actions a student makes are then compared to known motifs to update the user model. The correlations of each motif may be further adjusted for a specific student and/or a specific course based on newly observed increases/decreases throughout the course.

In a preferred embodiment of the present invention, a baseline learning path through the course is initially established, such that the path encompasses content Files which together sequentially cover all syllabus topics but do not necessarily encompass all available content Files. However, alternate content Files may be available, and a particular student might be better served on an alternate, personalized path consisting of both available content Files as well as Files constructed automatically by the present invention. Each student starts the course along this baseline default path or on a default path more particular to that student, and may be rerouted at any point based upon the current state of the student's then user model. In particular, User Modeling will employ the user model to determine whether the student is likely to benefit from an alternate path, and if so, Path Switching is invoked.

The purpose of Path Switching, at a high level, is to "change" or "switch" a student's path, to the extent appropriate for the individual. In a preferred embodiment, the User Modeling of the present invention assesses the need for Path Switching at set intervals throughout the course, such as but not limited to at the time a student completes a course Module or after completing a Segment, by determining whether a student may benefit from an alternate content File or sequence of content Files at any given time. If so, Path Switching will correspondingly adjust the student's path. A goal of the present invention is to adjust the path as needed and when needed, thereby improving the delivery sequence on a student by student basis and during the delivery sequence, such that all material is covered in the most learning-effective way possible for each student. One side benefit of this approach is that each student's overall duration through the entire course can be reduced though this personalization.

Attributes of Modules and Segments that are understood in advance, including their topics, media types, and past utility in being displayed to students, can be used by the present invention to determine how a student's learning path should be adjusted. In a simple example, a Module might be animation-oriented and have a File that has been demonstrably exciting to learners; if a student has a preference for animations and is struggling on learning the topics covered by this module, the student's path may be adjusted to include this Module or File and it may supplement or replace one or more Modules, Files, or Segments.

The user model will be invoked (i) by User Modeling to determine whether a change to the path is needed, and (ii) by Path Switching to determine what that change will be. As a simple example, Files may have test questions and when a student answers several test questions in a current File incorrectly, the user model may indicate low knowledge on these topics, and User Modeling may take this as an indication that the student would benefit from a repeat of these topics, revised in a way more suitable to the student's learning style. The Path Switching step may then search for content Segments in alternate course files that have highest similarity to the topics that the student needs remediation in. The process of the present invention may alternatively create new Files that are combinations of these remedial Segments, and insert these new Files as the next content in the sequence to be visited on the student's path.

More generally, the decisions of whether switching to an alternate sequence is likely to be beneficial and, if so, which content this alternate sequence will consist of, is determined in the present invention through artificial intelligence and machine learning methods. These methods include first mathematically analyzing the current state of the user model from the User Modeling step for signs of low (or high) knowledge transfer to determine whether remediation or adjustment will be beneficial to the student, and if so, identifying the corresponding combination of topics that needs remediation or adjustment. Then, they include selecting a plurality of alternate potential learning paths for the student by mathematically comparing the topics in need of remediation in the current user model with the content tags of the course files from the Content Tagging step, searching for the most relevant sets of material, and putting these sets of material together in appropriate sequences that could be delivered to the student. In other words, a set of potential next sequences is calculated and may be calculated regularly as the student exhibits behaviors. Finally, the methods include determining an at-that-time optimal next sequence from the set of potential sequences by the processor of the present invention, in a modeling sense, traversing each of the potential paths, and choosing the one with the highest predicted value or utility relative to that student. The system will then display this next sequence to the student, monitor the student's activity on the remediation content, and, in an embodiment, finally return the student to the next Module in the original baseline path. The predictions of the utility of each path to a student are updated as more users proceed through the course material and the result of each potential path is monitored. That is, a "best fit" model is established, based at least on a comparison with stored data on student performance, vis-a-vis paths taken and actions, student-by-student, and refined as more students are involved, and the present student's attributes are used to determine his/her best next Module, File, and/or Segments. Typically this may be achieved by a mathematical calculation of closest or best fit for different alternatives for that student (which, as an example, closest fit might be associated with correct on first attempt most improved).

The present invention includes several novel attributes such as the ability to customize the selection of Modules and content within Modules to be delivered to a student while the course is progressing and based on the student's interaction with the course. The student interaction ("measurements") can take the form of mouse clicks, durations between mouse clicks, sequences of mouse clicks, selection of topics to review, durations on particular screens, quizzes and results, and physical body (and/or eye) movements, as observed by cameras and/or audio recording instrumentation. These (among other) various interactions are captured by the system of the present invention and processed into "behaviors" so as to determine the student's overall strengths and weaknesses and specific positives and negatives relative to the topic material. In another example, the approach used by the student may be considered, such as recognizing when the student may be reflecting on video content (e.g., pauses in playing video), reviewing content, skimming content, or speeding through content (such as at a faster than default rate). Once determined, a next Module, aligned with the course syllabus, is delivered to the student, where the content contained in the Module is that most likely to be in line with the student's strengths and abilities.

It should be evident at this point that as the student progresses in the course, the calculations necessary to develop an updated user model, or best fit become increasingly complex but speed to adjustment remains vital. Such calculations require sophisticated computing technology.

The high-level goal of the present invention is to maximize the efficiency of both electronic learning and teaching, through a personalization system which minimizes the time that both instructors and students must spend to achieve the desired learning outcomes. In particular, one benefit of the present invention is that the extensive manual effort required by instructors to establish individualization logic in eLearning courses today can be eliminated. This goal is accomplished through the following, more specific goals of the present invention in turn: (i) modeling a student's knowledge state based on their behaviors exhibited on the different topics in the course, (ii) breaking course content down into Segments and associating these Segments with topics, (iii) determining at which points remediation is needed and which Segments this remediation should be comprised of based on the student's current user model, (iv) continuously improving the choice of remediation content for a given state of the user model based on observed learning outcomes, and (v) eliminating the need for an instructor to pre-define a mapping of course content to topics, and topics to learning paths.

The benefits to the present invention are numerous, including the ability to pro-actively and automatically place content in a course Module so as to align the Module with appropriate syllabus topics. The time a student spends in an online course can be reduced by matching the student's abilities with the best available course material for that student. Another benefit is that this process can be done automatically, without the need for a human to specify upfront where topics appear in content Files, what patterns in behavior to search for, or what sequence to present the material in, aside from the initial straight path through the course.

DETAILED DESCRIPTION OF THE INVENTION

Figure 1:
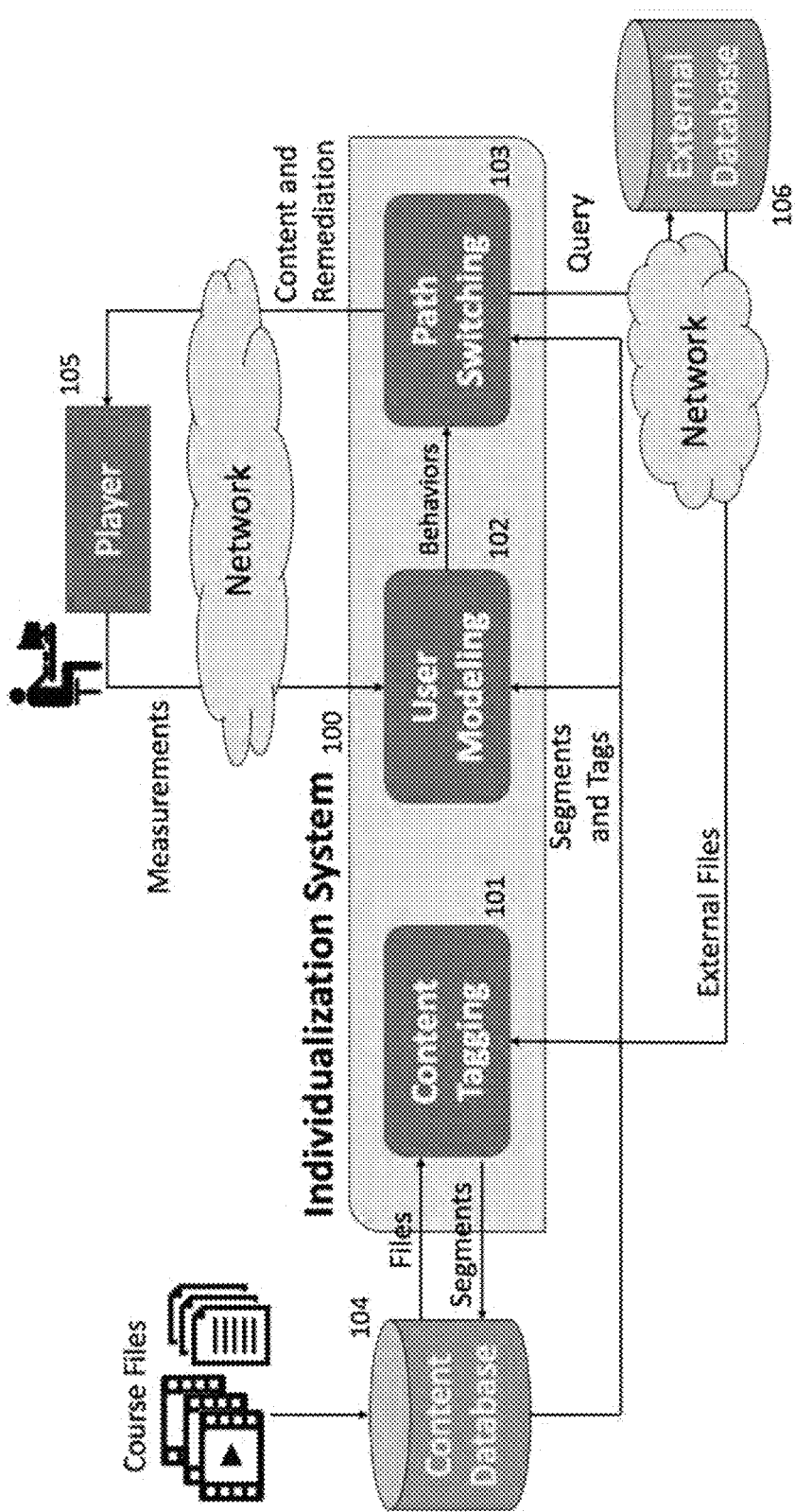
FIG. 1 is a high-level summary of the systems and processes involved in the present invention.

The present invention is directed to a system and methods for forming and transforming an eLearning course and associated course materials into a personalized eLearning course adapted to the student's interaction with the course, in a way that does not require upfront input from an instructor, supervisor, or other course administrator. An adaptive course, as referred to herein, is one that customizes the sequence of delivery individually for each student based on that student's learning desires, needs, and/or observed knowledge transfer.

In a preferred embodiment of the present invention, a preferred path is initially established such that the path encompasses content files which together cover all syllabus topics but not necessarily encompass all available content files. Finally, to the extent appropriate for an individual, the path can be changed or "switched". Path Switching is performed at set intervals throughout the course, such as but not limited to at the time a student completes a defined portion of a course, by determining whether a student will benefit from an alternate content file, or sequence of content files, at any given time and, if so, correspondingly adjusting the student's path. A goal of the present invention is to path adjust as needed, thereby improving the delivery sequence student by student, such that all material is covered in the most learning-effective way for each student. These potential revised sequences of content are determined by analyzing similarities between content files covering similar topical areas, and mathematically comparing their topic distributions as determined during the Content Tagging stage.

The decision of whether it is necessary to branch to an alternate sequence is preferably determined at least in part through machine learning associated with the student and triggers in the User Model. From the set of potential sequences, an at-that-time optimal one is determined by generating a prediction of the student's knowledge and/or preferences on the course topics after the processor of the present invention, in a modeling sense, traverses each of the potential paths, and chooses the one with the highest value.

This is not to say, however, that the instructor/author cannot provide input to the adaptation. If he/she has models to input into one or more of the stages, those can be accommodated. For example, the author may already have a variety of content sequences that can serve as potential learning paths, eliminating the need for the similarity step in Path Switching. Similarly, an instructor or author can add content, such as relevant to changing politics, which can also be used in Path Switching.

It is important to recognize that once a course is assembled by amassing a collection of content files, the course can be changed. An instructor, for example, can create and/or add new content files for the course and replace old ones. In addition, as new course files are added, replaced, or removed, the processes of the present invention—tagging and path development—are restarted, especially for the new content.

The present invention is necessitated by use of a computer, which is needed because the course is delivered via the internet and all user interactions are via the internet. The present invention is directed to development and implementation of an online course that is delivered in a customized way to a student. The course is comprised of a series of modules, each including at least one content file. Each content file represents at least one portion of the course syllabus. Different content files may reflect similar content but include different approaches to delivery of the content, such that different files may be more attuned to different learning styles; in general, these are referred to alternate learning modes.

From a hardware system perspective, the present invention includes a server architecture that contains one or more databases for storage of user and content information, which may or may not be updated over time, as well as storage of behavioral data. A content store contains the content items such as videos and/or references to external (stored external to the system of the present invention but accessible by the present invention) content that is available from third party content providers. The server architecture may include several processing stages (backend) that are responsible for the collection of measurements of user learning behavior, analytics such as content analytics, user learning behavior analytics and decision making. The software may be installed on multiple server instances that will allow for the scalability to millions of users and utilizes technologies typical for 'Big Data' processing, such as distributed processing, in-memory databases, high throughput message brokers and parallelization. The content is served preferably using the HTTP protocol, however other techniques such as ICAP (Internet Content Adaptation Protocol) and custom protocols may be deployed as well or alternatively.

The online courses to which this invention may be applied can include those that deliver any type of learning mode (i.e., content files) to end-users, including but not limited to one or more of videos, textbooks, articles, PDFs, slides, interactive presentations, animations, and/or simulations. Within a course, it is common for the instructor also to provide assessments in the form of quizzes, tests, and/or exams along with the grading criteria to evaluate a student's progress. For online courses, these assessments can be embedded in content files and often require interactivity by students (such as by answering questions). The invention can make use of the results of these assessments for individualization, though the present invention applies in cases where no assessments are provided as well. When assessments are included, the results of these assessments can be weighted and algorithmically included as a part of the path decision process and such weighting can be automatically adjusted based on attributes such as relevance to next syllabus topic or strength of differences in a student's observed learning skills. The results can include, for example, student attempts at correct answers, word choices in answers, time to answer, activities (e.g., look ups, either internal to the application or external) between delivery of the question and the student's answers, student confidence, and so on. The described combination of such results can be compared with known combinations, particularly in consideration of the subject matter, to obtain an understanding of the student's absorption of course content. Such information is usable by the system of the present invention to make a determination of what next module to deliver to the student—both in terms of subject matter and type of content (for example, more heavily video, more heavily text).

A goal of the present invention is to assist users in fully (and optimally) understanding all topics in the course, and to optimize this learning process by automatically selecting the best available content that directly corresponds to the topics currently in the syllabus and in line with the user's skills and/or abilities.

In the context of the present invention, each student becomes associated with a user model, which is a vector specific to the student, that adjusts as the system tracks the student's knowledge of, and preferences on, each of the topics that comprise the course. This vector is modified as the student interacts with the content in a content file based on the student's interaction with the content file. For instance, if the student scrolls back to hear the word "banana" six extra times, the vector for that student's use of the content file has "banana" correspondingly incremented. This revised vector is used as an input in determining the next content file to deliver to the student.

In the present invention, triggers such as incorrect attempts and certain behavior motifs will trigger the individualization. Our system will then be able to use natural language processing and machine learning methods to help students find or be delivered the best available content that corresponds to that particular test question. By doing so, the present invention is able to help students to locate the content that will help students to enhance their learning. Additionally, by automatically locating the best available content, the present invention helps to reduce learning time and to optimize learning efficiency.

In summary, we developed new frameworks for representing student video-watching behavior as sequences, we extract recurring motifs of student video-watching behavior using motif identification schemes, and associate these fundamental patterns with quiz performance, and we demonstrate that video-watching behavior can be used to enhance student performance prediction on a per-video basis, e.g., for earliest detection. This combination of summary items is used as input to determining student proficiency and understanding of course material and is used for selection of the next module to deliver to the student.

In general, algorithmic approaches are used toward selecting modules for delivery. That is, if the system can select among several modules for delivery, the method of the present invention determines various approaches to module selection (alone or in combination, shown below as examples):

To the extent that a student has shown difficulty in understanding some topic, such as through repeating sections with that topic or poor performance on a quiz, the methodology of the present invention automatedly selects a module providing greater detail around that topic.

If the student demonstrates proficiency with a formulaic approach, the next module could be more formulaic.

If the student demonstrates confusion with certain concepts, those concepts could be included in a next module but delivered with an alternate approach.

To the extent the student demonstrates body language of understanding or confusion, that input could be used in the next module.

If a student demonstrates difficulty with a particular topic and the topic is to appear in a next module, the student can be provided with refresher questions or can be quizzed earlier in the module relative to that topic.

To the extent students follow known motifs, modules may be selected conformant to success with similar modules of students that have followed similar motifs.

To the extent the student uses social networks for questions or information regarding content, that content can be a focus in questions or in a next module.

To the extent the student answers questions correctly on first attempt, second attempt, and so on, a decision is made as to which next module to deliver.

Also, measures of performance used by the present invention have been described as the scores that students obtain on their first attempts at quizzes, i.e., whether they are Correct on First Attempt (CFA) or not (non-CFA). However, other indicators of "performance," like engagement level, completion rate, or even factors outside of the IIC application provided by an instructor (like job task performance), are equally applicable to the present invention.

With these two specific measures, a goal is to relate video-watching behavior to in-video quiz performance. We are able to identify video-watching motifs, i.e., subsequences of student behavior that occur significantly often, in at least two datasets. These motifs by themselves are informative of recurring behaviors, and we are able to correlate the occurrence of certain motifs in a dataset with a change in the likelihood of CFA through mixed-effects modeling. For example, and as discussed in more detail later, we found that a series of behaviors are indicative of students reflecting on material, and tend to be associated with an increase in the chance of CFA in one of our courses and of non-CFA in the other. As another example, we identify motifs that are consistent with rapid-paced skimming through the material, and reveal that these are associated with a decrease in the chance of CFA in both of our courses.

In seeking appropriate models for behavior-based prediction, while some behavioral patterns of the motifs are significantly associated with quiz performance, their support across sequences are not sufficient to make large improvements in online CFA prediction. As a result, we also or alternatively use a second behavioral representation, which is based on the sequence of positions visited in a video.

Now, it is important to remove noise in the video-watching trajectories associated with unintentional user behavior. We handle two cases of events separately:

(i) Combining events: We combine repeated, sequential events that occur within a short duration (5 sec) of one another, since this pattern indicates that the user was adjusting to a final state. This is a common occurrence with forward and backward skips, where a user repeats the same action numerous times in a few seconds in seeking the final position; this should be treated as a single skip to the final location. Similarly, a series of rate change events may occur in close proximity, indicating that the user was in the process of adjusting the rate to the final value, which should also be treated as a single event.

(ii) Discounting intervals: Clickstream logs are the most detailed accounts of a student's video-watching behavior that are available for online courses today. Even so, it is not possible to determine with complete certainty if a student actually watched or focused on the video for the duration of time in-between the occurrence of two events. Still, we can identify two situations. The first is if the duration between events is extremely long; the user was obviously engaging in some off-task behavior during this time. The second situation is if events occur on two different videos; here, there is no continuity as the user must have exited the first video and opened the second.

Several algorithms are used to extract motifs from behavioral data. One such approach used by the present invention is based on a probabilistic mixture model, where the key assumption is that each subsequence is generated by one of two components: a position-dependent motif model, or a position-independent background model. Under the motif model, each position j in a motif is described by a multinomial distribution, which specifies the probability of each character occurring at j. The background model is a multinomial distribution specifying the probability of each character occurring, independent of the positions; we employ the standard background of a 0-order Markov Chain. A latent variable is assumed that specifies the probability of a motif occurrence starting at each position in a given sequence.

Motif extraction is formulated as maximum likelihood estimation over this model, and an expectation-maximization (EM) based algorithm is used to maximize the expectation of the (joint) likelihood of the mixture model given both the data (i.e., the sequences) and the latent variables. We use the standard dirichlet prior based on character frequencies for EM.

Some motifs are significantly correlated with substantial changes in the probability of CFA, independent of the specific videos and/or students (the increases can be as high as 9%, and the decreases as low as 10%). For each motif, the direction of the association is particularly important, because in many cases either would be intuitive. For example, a revising motif could presumably come from a student reinforcing material in the video prior to taking the quiz (in line with an increase in CFA probability) or from excess confusion caused by the material in the video (in line with a decrease in CFA probability), but the results indicate the former tends to be more likely in these courses. As another example, skimming could come from a student believing confidently that he/she is already familiar with the content in a video, which could intuitively be either a correct (increase in CFA probability) or an incorrect (decrease in CFA probability) perception, but results favor the latter.

The present invention further comprises an interface that can be used by an instructor to manage, facilitate, edit, analyze, visualize, and ultimately draw conclusions about the course that he/she is instructing related to the class as a whole or a subset of students. In an embodiment, a course can be integrated (i.e., it can contain various types of content, such as in an online course for which an author has provided both recorded lecture videos and excerpts from a textbook for the students to learn from) or individualized (i.e., the content from the author is adapted to each individual user, either through machine or human intelligence or a combination thereof). In the present invention, the user interface can transform data to an aggregated and easy to comprehend form, deliver conclusions based on the data including student actions, and deliver specific suggestions for course adjustments by the instructor, among other items. Such data and its analysis can be delivered based on individual students or an aggregation of students.

The instructor interface is preferably organized as an interrelated plurality of modules. These modules include, but are not limited to, the interaction and scheduling of course material for end users (i.e., the learners, or the consumers of the content). They also include modules that relate to real time processing, analysis, and visualization of various aspects of the user learning experience collected as a user interacts with the course material. Such modules include user concept proficiency of a set of author-specified course concepts, user learning behavior of the various forms of material (i.e., video, text) integrated into the course, user learning paths traversed as a result of an adaptation, and one or more networks related to social learning networks formed by the users as they interact with each other and the instructor on the various forms of discussion media integrated into the course. The present invention also includes methods to process user inputs in real time, and a multitude of methods by which outputs of each module can be visualized.

In an embodiment, each end user device has an interaction recorder (IR) loaded into memory, to monitor user interaction with the various learning modalities. In at least one embodiment, this IR is embedded in a GUI. For example, in a video, the time interval between two successive click actions (e.g., play, pause, jump, end of video, switching away from the video view, or closing the course application) is measured by the IR, as well as the UNIX Epoch time, starting position, and interval duration for each case. The specific type of click is captured as well including, for example, clicks away from the course material. As another example, for textual content, the time the user has spent viewing a page will be recorded by the IR each time she flips the page or switches away from the current text view.

Once collected, these behavioral measurements are preferably sent to a web server over a network connection for further processing and for comparison. More preferably, they are sent as they are collected, which also is the time at which they are processed for adaptation. In the context of the present invention, the measurements are in turn sent to and stored at an instructor's workstation, which may also include a GUI, where they are processed by the plurality of modules that constitute the instructor interface application, for both visualization and recommendation purposes. Six of these modules are depicted in FIG. 1 and will be elaborated on here.

In an embodiment, inputs collected about each user include but are not limited to:

a. Play, pause, stop, fast forward, rewind, playback rate change, exit, and any other video player events, as well as corresponding timestamps, durations, and any other information that specifies user interaction with the video player.

b. Page, font size, exit, and other text viewer events, as well as corresponding timestamps and durations that specifies user interaction with the text viewer.

c. Slide change, completion, button press, and other events triggered from viewing a set of slides, as well as corresponding timestamps and durations that specify user interaction with the presentation viewer.

d. Position and length of highlights placed on video or text at specific locations, or on a particular slide, where the video length is measured in time of video and the text length in number of objects from the starting position.

e. Position and content of bookmarks placed on video or text at specific locations, or on a particular slide.

f. Position and content of notes taken on video or text at specific locations, or on a slide, as well as whether these notes were either shared publically, shared with a specific set of users, or not shared.

g. Information on each post made in discussion forums, including its content, whether it was meant as a question, answer, or comment, and the number of up-votes it received from other users or the instructor.

h. Submission, time spent, and number of attempts made for each assessment submitted, as well as the points rewarded if the assessment was machine gradable.

i. Individualization structure, both from automated and human intelligence, including the learning paths for the course and the paths traversed by each user, and the user modeling dimensions (concepts).

There are other examples of user data collection and use as well. The method of the present invention may involve one or more of the following non-exclusive approaches for tracking student behavior and making recommendations based on the tracked behavior. Described below are a series of tracked behaviors, ranging from clicks, durations between clicks, clicks in a series, duration at particular videos, clicks of varying types during video play, and so on. In some cases, tracked behaviors may be analyzed as individual behaviors, as collections of behaviors, or a sequence of behaviors, any or all of which can be used to generate recommendations.

Behaviors can correlate to potential test results, particularly correct on first attempt (CFA) results. More specifically, CFA is a binary measure, equal to 1 if the user answered a question correctly on the first attempt, and 0 otherwise. A goal of the present invention is to improve each user's overall percentage of CFA results. As such, recommendations for implementation are made based on improving such results.

Consequently, the present invention tracks behaviors, compares behaviors to those of a known population, and identifies adjustments (recommendations) for a user based on a combination of behaviors of populations with high and low average CFA scores so as to determine how to adjust material delivered to a student. Of course, at least some of those changes are automatically implemented and the instructor is given indication of those changes as well as recommendations for other changes.

For instance, we have identified motifs, i.e., sequences of events that form recurring patterns of user behavior, which are significantly associated with CFA (i.e., correct answer) or non-CFA (i.e., incorrect answer) submissions on questions corresponding to the material. The events that form a motif can consist of any combination of behavioral action collected from a learner as he/she interacts with the course application, such as, but not limited to, play, pause, skip backwards, skip forward, rate change faster, rate change slower on a video or interactive slide presentation, scrolling up or down in an article or resizing the view, creating or sharing a note, and mouse movements. In this way, a motif can be based on recurring patterns either within one particular learning mode (e.g., sequences of actions in a video), or across multiple modes (e.g. sequences of actions in a video, followed by a switch to an article). One example is a series of behaviors which are indicative of students reflecting on material, which are significantly associated with the CFA sequences in at least one course we tested. As another example, we have identified motifs that are consistent with rapid-paced skimming through the material, and have revealed that these are discriminatory in favor of non-CFA (i.e., submitted incorrect answer) in different courses. Incorporating the lengths (e.g., duration of play before the next event is fired) in addition to the events themselves was essential to these findings, because motif extraction with the events alone does not reveal these insights. These findings can further be used by an instructor to determine which patterns in behavior are associated with successful results in his/her course; without the data to back up the correlations, it is unclear whether a given motif would be associated with CFA, non-CFA, or neither.

Specifically with respect to video, we have determined that clickstreams may be analyzed so as to determine a likelihood of CFA performance. Certain clickstreams are more indicative of improved understanding and other clickstreams are more indicative of less understanding of content. As stated, clickstream logs may be generated as one of four types: play, pause, rate change, and skip. Each time one of these events is fired, a data entry is recorded that specifies the user and video IDs, event type, playback position, playback speed, and timestamp for the event. In general, we define each of these in a particular way and use collected data to determine recommendations toward improving CFA.

In addition, the analysis may be performed relative to each user, to a collection of users, or all users.

To result in a properly usable set of data, it is important to denoise clickstreams. In order to remove noise associated with unintentional user behavior, we preferably denoise in two ways. First, we consider combining repeated, sequential events such as those that occur within a short duration (5 sec) of one another, since this indicates that the user was adjusting to a final state. For example, if a series of skip back or skip forward events occur within a few seconds of each other, then likely the user was simply looking for the final position, so it should be treated as a single skip to that final location. Similarly, if a series of rate change faster or rate change slower events occur in close proximity, then the user was likely in the process of adjusting the rate to the final value. Second, we consider discounting certain unnecessary intervals between events, when the elapsed time between the two events is extremely long (e.g., greater than 20 minutes), which indicates the user was engaged in off-task behavior.

In one embodiment of the present invention, we make determinations by fitting or performing fit comparisons of collected data to a variety of known or determined motifs, e.g., reflecting, revising, and skimming behaviors. Each motif has a known set of methodology for user improvement (e.g., adaptation) and based on the motifs that a user exhibits while interacting with the course material, conclusions may be drawn relative to recommendations. Fit here may mean determining closest mathematical similarity. For example, a reflecting motif within a segment of content will consist of a series of plays interspersed with long pauses; an instructor may be recommended to divide content into chunks according to the play events where this motif occurs, and then create additional content within these chunks, because an instructor-generated summary may be more efficient than a user spending a longer time to recap the same content (as would be dictated by the motif).

As stated, at least some of these motifs are significantly associated with performance, which can similarly be used to generate recommendations about how content can be modified to create a more effective learning experience. Some basic analysis, as an example, shows that pausing to reflect on material (including play back) repeatedly is the most commonly recurring behavior. If the time spent reflecting is not too long, but longer than the time spent watching, then a positive outcome is most likely.

In another example, the present invention factors in a position-based sequence representation, which factors in the location in videos that a user visited. These data may be used to better define the student's motif, and lead to recommendations within specific video intervals, rather than at the level of a single video.

In addition, transitions between clickstream events may be tracked and modeled.

Measurements collected about user interaction with a specific learning mode can also be translated into intuitive quantities that summarize behavior, such as the fraction completed and time spent (relative to the length of the content). Particularly with respect to video, we have computed the following non-exclusive list of nine summary quantities (behaviors) of interest:

1. Fraction spent (fracSpent): The fraction of (real) time the user spent playing the video, relative to its length.
2. Fraction completed (fracComp): The video percentage that the user played, not counting repeated play position intervals; hence, it must be between 0 and 1.
3. Fraction played (fracPlayed): The amount of the video that the user played, with repetition, relative to its length.
4. Number of pauses (num Paused): The number of user pauses.
5. Fraction paused (fracPaused): The fraction of time the user spent paused on the video, relative to its length.
6. Average playback rate (avgPBR): The time-average of user selected playback rates.
7. Standard deviation of playback rate (stdPBR): The standard deviation of the playback rates selected over time.
8. Number of rewinds (numRWs): The number of user jumps backward in a video.
9. Number of fast forwards (numFFs): The number of user jumps forward in a video.

These quantities can also form a special motif, where each "action" is a summary of actions on a specific learning mode; e.g., completing 50% of a video, followed by fast forwarding on the video twice, followed by skipping over 20% of an article.

Machine learning algorithms, among others, are implemented on these inputs so as to discern and categorize the types of human interaction. Machine learning is a branch of artificial intelligence (i.e., intelligence exhibited by software) where there is an inductive step in which the algorithm learns from and is augmented by the data. In this context, the algorithms for the interface include both those required to process the data for visualization, and those to recognize patterns within, make predictions about, and generate recommendations from the data to assist the instructor.

Since each course typically is instructed in terms of a set of learning concepts (e.g., in an algebra course, some concepts may be "factoring polynomials," "solving quadratic equations," and/or "simplifying expressions"), machine learning algorithms are also applied on a concept-by-concept basis, and leverage similarities detected between these concepts in monitoring user interaction, which further improves the quality of the interface outputs. These concepts could either be pre-defined and labeled by the course author, or are extracted through machine learning to find the set of concepts that are optimal in the sense of identifying the key factors affecting user performance. At times, the system may suggest recommendations to the instructor. For example, a particular student's data might be inconsistent with known patterns or might not yield sufficient confidence to implement a change. In such circumstances, the system might present data regarding a student or regarding an entire class, or something in between, indicating confidence intervals around various options. For example, if students are spending an inordinate amount of time on one lecture, the system may recommend a number of alternatives to that lecture and, as appropriate, the lecture could be replaced in the repository (e.g., indicating that the lecture itself has room for improvement).

The output of the instructor interface is then a processed, analyzed, and visualized version of the inputs described above, with recommendations made to the instructor for adoption as appropriate. These include, but are not limited to:

a. Depictions of video-watching quantities, such as percent completion (i.e., percent played), time spent, and frequency of different events for each user, both in aggregate across the video and for individual intervals.

b. Depictions of text-viewing quantities, such as percent completion, time spent, and frequency of different events for each user, both in aggregate across the text document and for individual segments of the text.

c. Visualizations of similar quantities of behavior collected on other forms of media, such as audio and presentations.

d. Recommendations to revisit specific portions of a learning mode where the level of focus, as dictated by the quantities in (a)-(c), is exceedingly high or low.

e. Depictions of learning style preferences, including the percentage of focus placed on each of the different modes (video, text, audio, and/or social learning), clusters of users based on these preferences.

f. Depictions of progress or proficiency on each learning concept for the course per user, measured by performance on corresponding assessments, considering all assessments up to the present, all through a current time, or even future predictions.

g. Recommendations for which users and/or course concepts are in need of instructor intervention, through the quantities in (f) that identify particularly weak users or challenging material.

h. Early detection of users and/or content that may prove particularly challenging in the future, based on proficiency prediction and forecasting.

i. Depictions of the social network of users, obtained from their post and comment relations on the discussion forums, and their sharing of notes, both in aggregate across all material and for individual sections of content.

j. Recommendations as to which users can be suggested to form study groups, based on their frequency of interaction determined in (i), and their set of proficiencies in (f), which should be mutually reinforcing.

k. Depictions of user learning paths, the level of mastery and/or learning style preference required for each path, the specific users traversing each path, and aggregate information about behavior and performance of users on respective paths.

l. Depiction of the identified motifs (e.g., reflecting, revising, speeding, skimming), which users/content modes have exhibited these motifs, and how often they occur.

The output can also be customized by/for an instructor so as to, for example, provide further granularity. That is, an instructor may pre-set displays.

The present invention includes a plurality of ways to visualize these outputs on the instructor interface. These include, but are not limited to, the following:

a. Scatterplot of points, in 2 or 3 dimensions, where the dimensions of interest are selected by the instructor.

b. Time-series plots of a quantity, where the time interval and granularity of measurement are selected by the instructor.

c. Histogram plots, which are graphical representations of the distribution of a quantity of interest. There can be one or two independent variables on top of which this variation is measured, and they must take continuous values (e.g., intervals of a video).

d. Bar graphs, which are representations of how a quantity of interest varies over one or two discrete sets (e.g., set of students).

e. Box and whisker plots, which show the distribution of a set of points and emphasize the median, quartiles, and outliers of the dataset. They are typically depicted side-by-side for multiple datasets, to show the difference in distributions.

f. Network graph structures, consisting of nodes, links between the nodes (either directed or undirected), and possibly weights on the links, which may be color coded to represent different ranges of values. These graphs can emphasize various network substructures, such as clusters, cliques, or the most central nodes.

g. Popups and notifications, which are included in the various modules for recommendations and early detection as appropriate.

h. Heat maps, which indicate the level of focus of learners at specific points within the content modes, and annotations on top of these heat maps to depict motifs.

In an embodiment, each of these visuals is interactive, meaning that the instructor can select the quantities, dimensions, datasets, and graph plotting properties specified above. They are also real-time in two senses: the displays may update instantaneously when the instructor makes a new selection, and any new input data will be processed immediately and the corresponding display re-rendered.

With these concepts in hand, and the association between these concepts and the content learning material and assessments, the proficiency levels can be determined through a variety of methods. For example, the average score that a given user obtained on all the assessments related to a given concept can be taken as a measure of proficiency on that concept. This method can be enhanced by the application of a number of machine learning algorithms as well. For one, since a user may not have filled out all assessments related to a concept, an algorithm can be applied to predict the score that a user would have achieved on those assessments. This algorithm could be of collaborative filtering in nature, where similarities between users and assessments (e.g., quizzes) are extracted from the available data, and in turn used to build models on a per-user and per-quiz basis, the combination of which leads to the desired prediction. This method could also leverage correlations identified between behavioral information (e.g., fraction of time or number of pauses registered for that user on a video related to the assessment) to enhance the proficiency determination, by applying a supervised learning algorithm such as a Support Vector Machine (SVM) that can readily identify such correlations and apply them to prediction when they exist; this is especially useful early on in a course where there is not yet much information about specific users or quizzes for standard collaborative filtering to be effective. Behavioral motifs can also be used as machine learning features the enhance prediction quality as well.

Note that these concepts are typically the same as dimensions by which the course is individualized. In an embodiment the instructor also has the ability to define dimensions to monitor, especially if the baseline course is not individualized already.

If it is determined that the student does need to visit an alternate path, then the backend will determine a potential new path algorithmically. A method to seek the best available content applicable to the student may include, but is not limited to, cosine similarity. Cosine similarity is a measure of the similarity of two vectors, varying between −1 (perfectly negative correlation) and +1 (perfectly positive correlation) while a similarity of 0 means there is no correlation. Another measure of similarity usable in the present invention is KL Divergence, which quantifies the "departure" of one vector from another, when the vectors are both probability distributions. In at least one embodiment, extended intervals, such as those related to the student leaving the course and picking up later, may be discarded. In another embodiment, the alternate path may be based on frequency or quantity of student rewinds.

Figure 5:
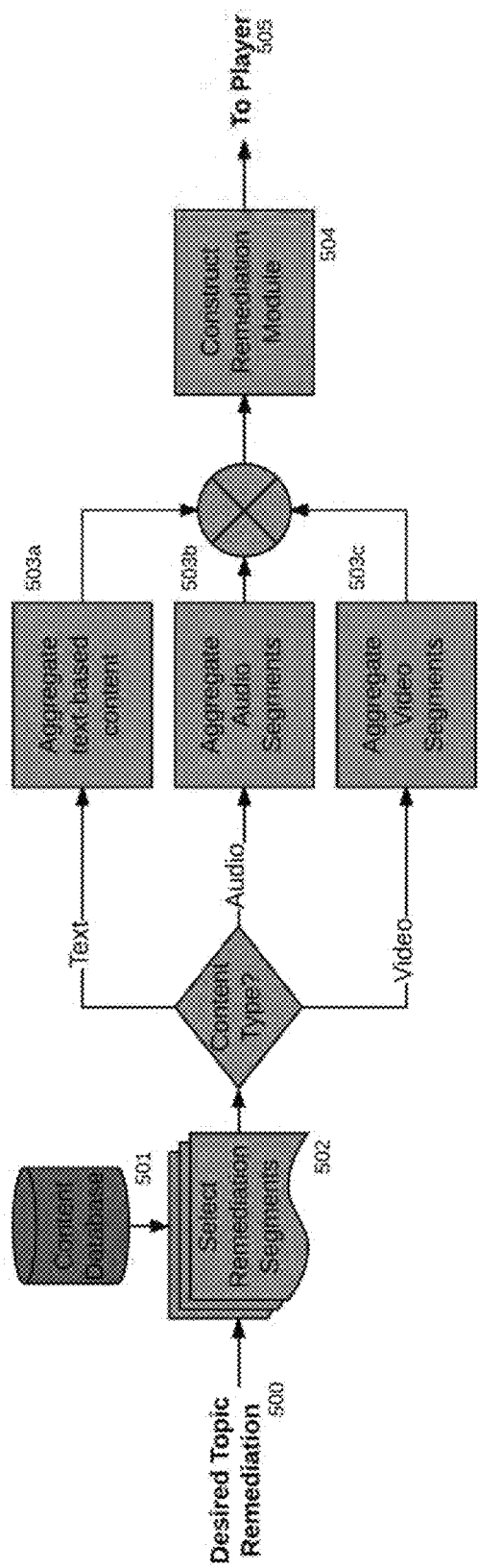
FIG. 5 specifies an embodiment of the Path Switching method of the present invention.
Figure 6:
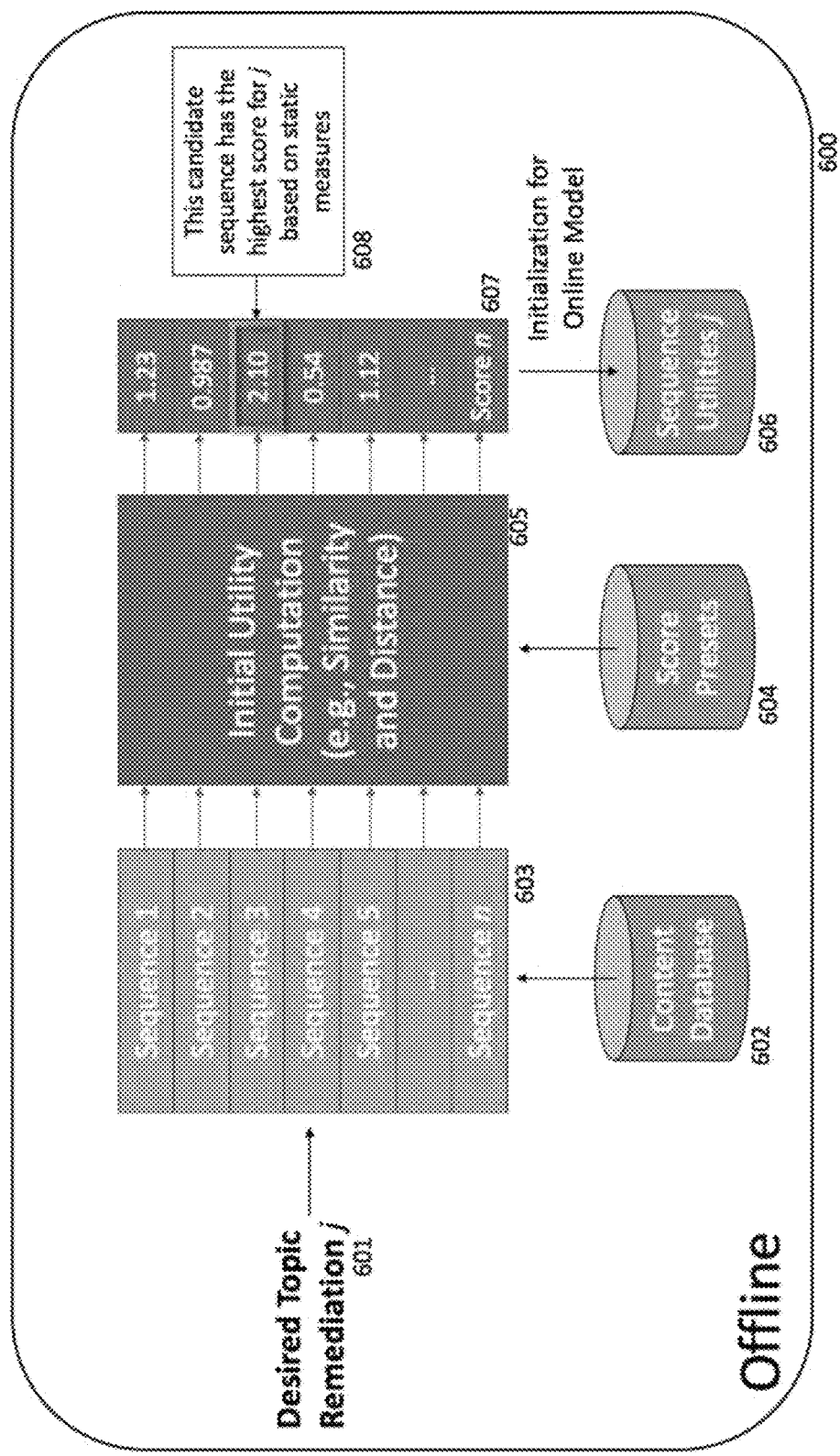
FIG. 6 illustrates an embodiment of the process of initializing or determining the utilities associated with different candidate sequences in an offline manner.

With the matrix of topic terms and associated frequencies stored in the backend, the backend will take the distribution for this content unit and compute cosine similarity between this particular distribution and the distributions extracted from the previous content files in the course. In the present invention, we do all such computation between each pair of files for all files, and store the result in a file-to-file similarity matrix. An example of such a matrix is shown in FIG. 5: here, there are four files in the course, and row I, column J indicates the similarity between files I and J. These values are meant as examples to illustrate the key properties of similarity, and will vary depending on the specific files that make up a course. Notice the matrix is symmetric, i.e., the cosine similarity between file I and file J is the same as the cosine similarity between file J and file I, though this may not be the case depending on the similarity measure that is used (e.g., it is always true for cosine similarity, but not for KL divergence). All diagonal entries in the matrix are 1, since a file is perfectly similar to itself, and values below 1 indicate how much the files deviate from each other. In this matrix, File 2 is more similar to File 3 (value of 0.85) than it is to File 4 (value of 0.2). With a matrix like this in hand, for each file, the other files are ranked from most similar (highest similarity value) to least similar (lowest similarity value), not including (i) the file itself (it is not practical to route the user back to the same material they have struggled on), and (ii) future files (files appearing later in the syllabus have not been covered yet, and may contain more complicated material the instructor has not yet taught). According to this logic, in FIG. 5, File 1's closest neighbor is File 2, File 2's is File 1, and so on (entries bolded). The most similar one here, for example, could be the video from the unit where the test question occurs. Then the web application will display that video to the user. By doing so, the web application forms an individualized and customized user learning experience across different learning modes. An example of algorithmically designing the path is illustrated in FIG. 6. The solid line route is an example of triggered individualization whereas the user is routed to the video in Module 3 (denoted M3) and then the article in Module 5 (denoted M5). Another example is the dashed line route whereas the user is routed to the article in Module 4 and then the PDF in Module 5.

Note that in Path Switching, the present invention sets guidelines for individualization. As noted, although a preferred path is initially established, the path can be altered based on individualization. First, individualization is stopped either when the user no longer activates a trigger or a maximum number of alternate paths for a file have been tried. Second, the present invention may re-route a user to multiple content files within the same reviewing session, either sequentially (i.e., one file at a time, in sequence) or concurrently (i.e., within the same view), with the next decision point occurring after the user has finished visiting all of the content on the alternate path. An example would be a user triggered a re-routed individualization that leads to, for example, two PDF that come from different modules. The IIC player may display two PDFs side by side concurrently.

After such individualization, the present invention aims to assist the user in improving learning quality. For example, in the test question trigger example, the present invention aims to assist the user in answering the test question correctly. If still incorrect, than the backend computes cosine similarity between the test question vector and vectors from previous units. The backend will then find the mode with the highest similarity and present that as the next module to the user. If still incorrect, this process will repeat until the user answers the question correctly or a maximum number of test attempts is exceeded. This "time out" is similar to the time out of triggering additional reviewing paths within paths, as described previously. Overall, the present invention will search for one of the triggers that trigger the individualization again the next time the user goes through the unit. The system of the present invention will keep delivering other content until no triggers are found, or until a timeout counter is reached, at which point the learning process will proceed according to the original path.

FIG. 1 is a high-level depiction of the system and processes involved in the present invention. Individualization System 100 of the present invention includes the three main components: Content Tagging 101, User Modeling 102, and Path Switching 103, which are detailed further herein. Player 105 represents, at least in part, any Graphical User Interface (GUI), such as one embedded in a software application on a personal computer or an app on a tablet, by which the eLearning course is delivered to a student. Player 105 receives instruction on what content to deliver, in what sequence, and any student preferred layout from the Individualization System 100, and displays this content to the student, allowing them to view and traverse the course material. This content resides at least primarily in a Content Database 104, which stores the original Files and their modified versions as determined by the Individualization System 100. Content used for individualization may also originate from an External Database 106, which may include relevant files collected from the public Internet, a private Intranet, or other courses that are related to the present course. As an example, the Content Database 104 may contain content specifically developed for the course, whereas the External Database 106 may include reference material. In an embodiment, the storage sites 104 and 106 are unified into a single database; they are shown as separated in FIG. 1 for purposes of decoupling the content provided by course authors and that which is collected from external locations.

In the present invention, content in the Content Database 104 is arranged in Files. Different Files may be directed to different media. Each File is parsed into logical portions by the present invention, these portions referred to herein as Segments. Each Segment, and consequently each File, will be tagged with one or more tags descriptive of the content as determined by the Content Tagging 101 of the invention. The Files are arranged in a preferred roadmap commensurate with a logical flow, and notably, there is no requirement for this roadmap to contain all Files. At least one preferred path through the roadmap is prepared, where the preferred path encompasses all topical areas in the course but not necessarily all Files. Preferred paths may also be drawn based on additional criteria, such as but not limited to preferred learning approaches. A particular student may or may not have known characteristics, such as a preferred learning approach. In either case, a preferred path for that student may be applied to that student and as the course is delivered to that student, the student's actions are all captured. Some sequences of actions and/or test results may be known to indicate mastery of a topical area or the need for additional content for that student and the preferred path is correspondingly adjusted.

In the present invention, content in the Content Database 104 is stored in Files. Each File is parsed into logical Segments. Each Segment is tagged based on its content, and a road map is prepared for the delivery sequence to a student with a preferred path through the roadmap also being established. In one embodiment of the present invention, the Player 105 is in communication with a user's local workstation GUI while the Individualization System 100, Content Database 104, and any External Databases 106 lie accessible in storage facilities such as cloud services or an external server, and the Player 105 communicates with the Individualization System over a wide area network (e.g., the public Internet) or a local area network (e.g., a private intranet). However, other designations are also possible, such as having all apparatus reside on the user's workstation.

In the present invention, Player 105 also collects or records student actions together with an indicator of time of each action (at least related to other actions), for analysis by a processor (for identifying behaviors, among other reasons).

Figure 2:
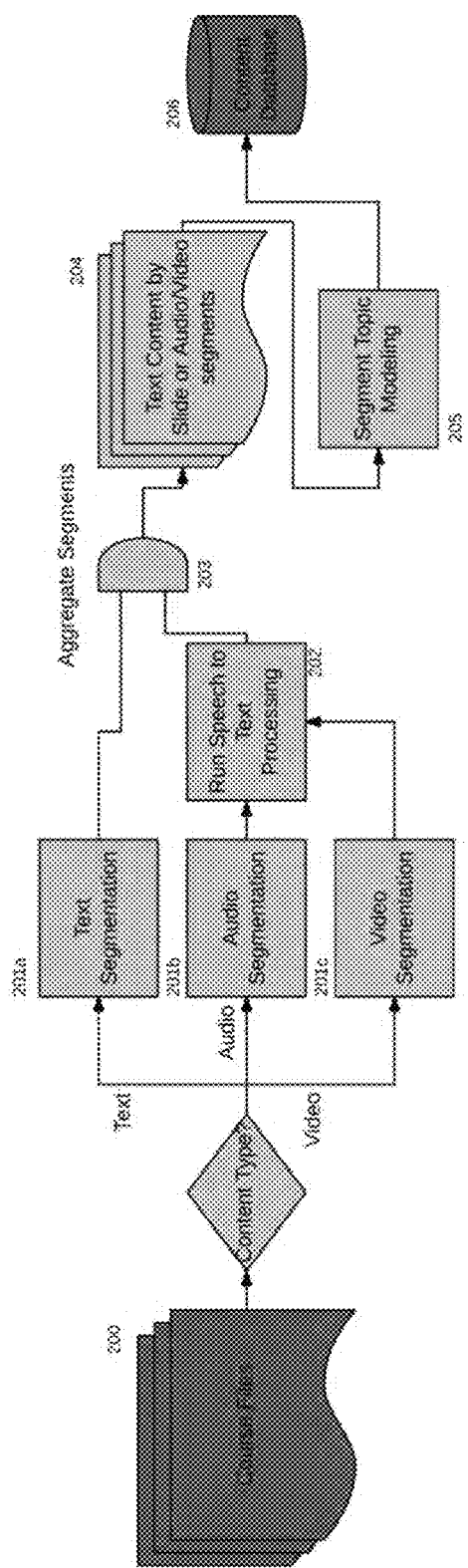
FIG. 2 specifies an embodiment of the Content Tagging method of the present invention.

Content Tagging:

FIG. 2 depicts the main components of the Content Tagging 101 step. The system of the present invention must first preprocess all the Course Files 200 comprising the course, and in doing so, automatically associate them with tags based on their material. The present invention can support a plurality of content types, including but not limited to the following: slides (e.g., .ppt), PDFs, videos (e.g. .mov, .mp4), audio tracks (e.g. .wav, .mp3), textbooks, audiobooks, podcasts, quiz/exam questions requiring user input, and other interactive media (e.g., modules built in Articulate Storyline, Lectora, or Adobe Captivate authoring tools). Each course can be comprised of one or more of these content types; the present invention places no limitation on this so long as the Player 105 in FIG. 1 can support these formats.

As shown in FIG. 2, a course file may be segmented based on its content (text 201a, audio 201b, and/or video 201c) and, as needed, speech to text processing 202 may be employed. As appropriate, Segments may be aggregated 203 and arranged 204 such as by one or more topics 205 and stored in Content Database 206 (modified as to what started in Content Database 104).

The first step in Content Tagging 101 is ingestion. During content ingestion, the system potentially breaks files into smaller "building blocks," referred to previously as content Segments. Segments form the basis for building the adaptive versions of content by piecing them together in various sequences. In a preferred embodiment, content tags are assigned to each Segment, with each tag being a textual or quantitative summary of the topics covered in the Segment and the degree to which each is covered. With the ability to break down a course to the Segment-level and reorder how that Segment-level content is presented, only Segments that a specific learner needs to learn from are shown to a particular student. This process thus saves students time and allows them to focus on topics that need their attention, such as those which need to be reinforced individually.

Content Tagging 101 may be achieved in an automated fashion in the present invention. Segments can be identified using text analysis techniques to search for logical breaks in content. Various tools can be used to identify tags for each segment based on parts of speech, synonyms, and frequency of such terms. Tagging may be applied to both Segments and to Files.

Figure 3:
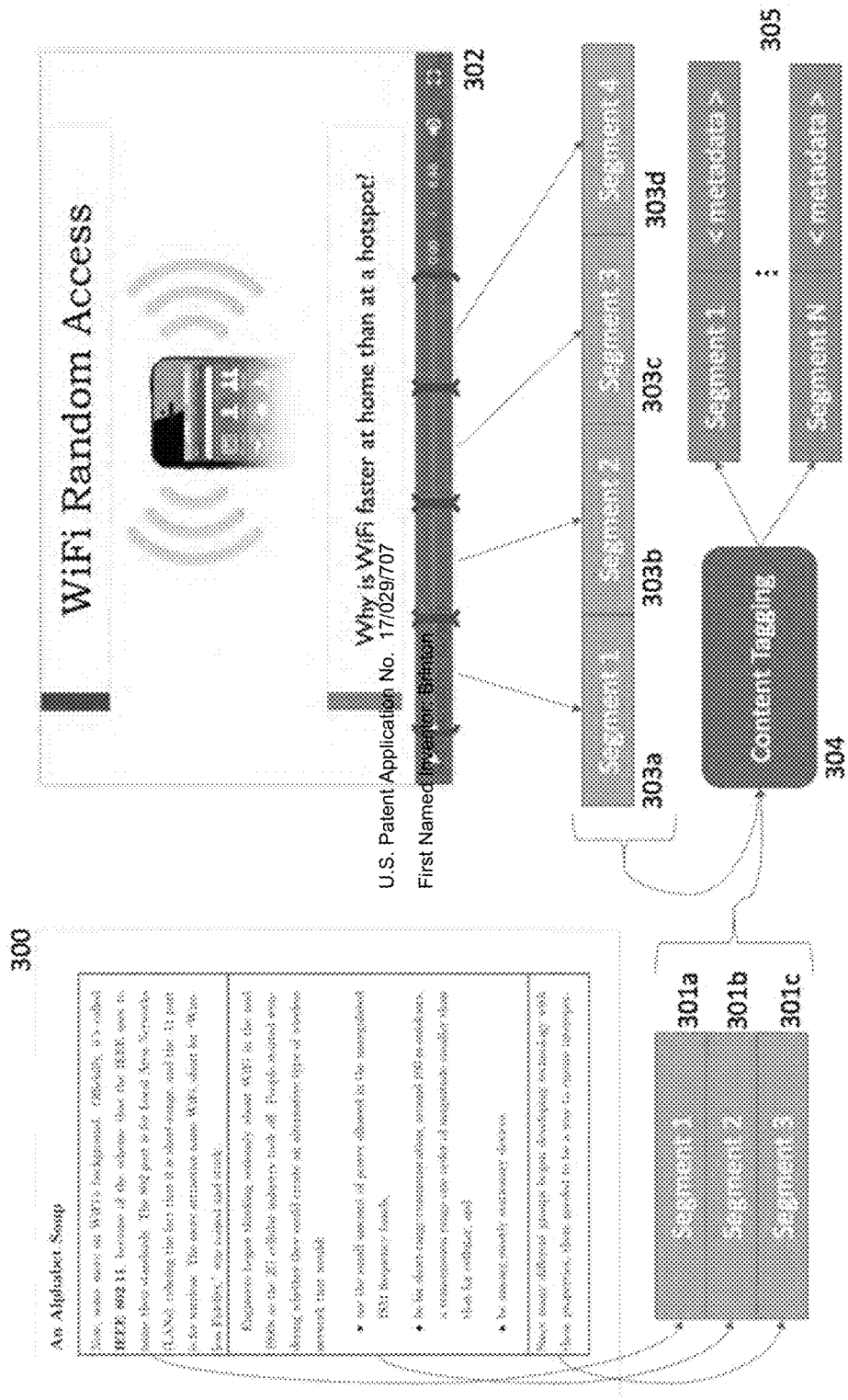
FIG. 3 illustrates how content Files are broken down into Segments in an embodiment of the present invention.

Segment formats can differ substantially, both between content types and between courses. In one embodiment, each File is divided into discrete homogeneous Segment lengths, e.g., taking every paragraph in a PDF, every 15 second clip of a video, video clips selected based on the presence of a pause, every slide of a slideshow, every 30 seconds of an audio clip, or every quiz question as a different Segment. This is depicted for Files 300 and 302, which are respectively broken down to Segments 301a-301c and 303a-303d, for video and PDF content in FIG. 3. Segment sizes can be scaled up or down based upon volume and other course attributes, too; for example, a course with 30 MP4 videos each averaging 10 minutes long could have a Segment defined as 60 second chunks of the videos whereas a course with 10 MP4 videos averaging 2 minutes long could have a Segment defined as a 20 second chunk. A textbook with 100 chapters might have a Segment set as a single chapter, whereas a course with 10 PDF documents might also have a Segment defined as a single chapter. In another embodiment, Files are split heterogeneously based on changes in topic composition, e.g., another Segment is created once the topic being covered has changed significantly. Alternatively, Segments may be of different size or length. Once broken down into Segments, we can see that the Content Tagging 304 is performed which provides Metadata 305 about each of the different Segments in the course.

One significant goal of tagging is to associate words and their frequencies with behaviors of a student and, therefore, to associate that student's behaviors with stored motifs, so as to determine when to switch paths.

Returning to FIG. 2, Segments may be stored in Content Database 206 differently from one another depending on the content type. For text-based content, the system scrapes the file format to retrieve raw data. This raw content is assembled into Segments which may have the same or different sizes, where the filename is used to provide information for indexing and identifying the source of the content. For audio and video-based content, it is first necessary to convert these Files from a single File to many Segments, each being the defined Segment size. Each File is run through a cross-platform multimedia framework that breaks the File up based on the parameters given and renames each Segment based on its order in the video. For example, the first 15 seconds of a video might be prefixed by '00', the second by '01' and so on. To obtain content tags for these Segment types that are textual in nature, it is necessary to generate a textual document that specifies the material contained in the audio and/or visual components. In a preferred embodiment, this text document captures all words spoken and/or written down by the narrator at any location in the File, which can be obtained through a Speech-To-Text System 202, as shown in FIG. 2. A plurality of Speech-To-Text Systems 202 exist today that can be used to transcribe the narrations, such as but not limited to Watson Speech to Text and Amazon Lex. Storing these tagging files in association with a corresponding media file is important for the Speech-To-Text processing that must be done, but the system also stores the Segments with all other course content, as they are necessary to build custom content Files in the Path Switching 103 stage shown in FIG. 1. Note that in addition to the transcribed text, these Speech-To-Text Systems 202 typically return a confidence level associated with the conversion accuracy; in an embodiment, the invention can utilize the confidence in the accuracy to notify a curator that revisions might need to be performed on the transcribed document if the confidence is below a certain threshold.

The present invention also includes a method for ensuring that image-based content, whether in a slide, PDF, or other format, is preserved in the Segment or Segments where it is referenced and/or appears. For example, if a PDF Segment mentions a figure in its text, then the accompanying image is stored together with the Segment for concurrent display, and if a slide references an image from a previous slide, it will be replicated in the current Segment as well. To accomplish this in the present invention, images in the slides and PDFs are extracted and tagged based on the Segment they are accompanied with and any other figure information that can be used for reference. Images may also be passed through OCR methods to extract text that may be stored in a pictorial format; this text is appended to the Segment so that it can be used in content analysis, but not to be served up as custom content, since the information is already contained in the image.

At this point, content Files are parsed into segments and each segment has at least one associated tagging File and may also have other Segments or portions of Segments associated with it.

Once this Segment creation and pre-processing is complete, it may be desirable for the system to order the Segments as they are intended to be accessed (e.g., aligned with the syllabus order) in a non-adaptive version of the course. This would ensure in the Path Switching 103 step that Segments appearing later in the course are not chosen, for example, for remediation content sooner than appropriate, since that material may not have been covered yet. For this to happen properly, the structure of the non-adaptive version of the course must be known: in general, a course can be thought of as a sequence of Modules, each of which contains one or more content Files, and there is neither a restriction on the number of Files nor on the types of Files that can be included within a single Module. With this, the ordering of the Files within a Module is what needs to be determined, since Segments within each File are simply placed in a natural sequence, as are Modules within the course.

There are a few special considerations for ordering Files within a Module. Firstly, quiz/exam questions, often a different content type than the rest of the course and important for the User Modeling 102 stage, must be parsed and included in the linear ordering of the Segments, even though they might not be useful for some students. In one embodiment, the entire quiz question, including the prompt, answer choices, and explanation are stored as a single Segment. The system of the present invention includes the ability to recognize quizzes and tests, tagging them, and properly sequence them. Secondly, a Module of the course may need to have multiple content Files displayed simultaneously, with no clear order intended. A common example of this is courses which include a video and a PDF side-by-side within each Module, with the PDF explaining the video material textually. In this case, the Segments between the content types can be placed in an arbitrary order, as long the ordering stays consistent. In one embodiment, it is assumed that one File type will be viewed before the other, and their Segments would be ordered accordingly.

With the course broken down into Segments and ordered accordingly, the last part of Content Tagging 101 as shown in FIG. 2 is Segment Topic Modeling 205, which is the assignment of textual and numerical tags to each Segment. In a preferred embodiment, this is done through NLP techniques of Artificial Intelligence (AI) that extract key words from a collection of documents and then represent each document as the collection of key words it possesses. Applicable NLP techniques include, but are not limited to, Latent Dirichlet Allocation (LDA), Term Frequency-Inverse Document Frequency (TF-IDF), and others which model document-topic and topic-word distributions. A "distribution" is a mathematical object that gives the fraction of each item (here, word and topic) that appears in the larger collection (here, topic and document, respectively). With the NLP technique in place, the invention treats each Segment of the course as a separate document, so that the Segment-topic distributions can be obtained. Each Segment's topic distribution can then be taken as its content tag.

As a simple example, suppose a course consists of six topics A, B, C, D, E, and F. The distribution <0, 0.2, 0, 0.5, 0.3, 0> then specifies a Segment comprised of 50% of words from topic D, 30% of words topic E, and 20% of words topic B, which would occur if the breakdown of words in this Segment followed these particular topic proportions (a distribution must sum to 1). The frequencies of the topic terms is significant here because intuitively, the more frequently a term appears, the more important that particular term is likely to be to the particular Segment. Note also that stop words (for example, "I", "and", "the", and so forth) need to be excluded prior to applying the NLP techniques. Also, if a syllabus, outline, or related material is available, that material is usable as a guidepost to better understand topics.

The distributions, particularly the frequency of the topic terms, are used later to calculate similarities between content Files and are used relative to syllabus topics. If, for example, a user is recognized as having difficulty with Topics B and D, that recognition can be used as input in determining which Segments should be delivered to that user next. Such recognition is done in the User Modeling 102 stage as shown in FIG. 1, and could be determined, for example, by observing that the user needs to review content with those terms, performs poorly on quiz questions associated with those terms, has poor confidence relative to those terms, or some combination of these or similar factors.

The previously mentioned NLP techniques allow the Content Tagging 101 of the course to be represented as a matrix, with each row in the matrix representing the topic the a different Segment and the columns representing the distribution of that Segment's content originating from a given topic. Since these topic distributions for Segments are used for further content creation, the matrix can be stored in various formats, including but not limited to, files and database stores. The design choice of where to store these topic distributions is important to the speed of performance of the system because queries for individual Segments and for all Segments are frequently made while a learner traverses through a course.

Upon storage of the topic distributions for all Segments in the course, the Content Tagging 101 step of FIG. 1 is complete. Although implied, in a preferred embodiment of the invention, all the Segmented content in the course is maintained in its current format on a cloud-based environment. All text content type Segments are stored as text documents, whereas video, audio, and other interactive media Segments would be stored in their original File type. A naming convention must be applied such that the Segment's topic distributions (as discussed earlier) correspond to a File stored in the cloud-based environment for later content building.

User Modeling:

Recall that a main objective of the present invention is to generate personalized content for learners after they exhibit certain behaviors. The purpose of the User Modeling 102 step shown in FIG. 1, at a high level, is to model a student in terms of these behaviors and the implications of those behaviors to proficiency in the course material and/or preferences of specific content types or display approach. These behaviors include, but are not limited to, percentage of content completed, time spent watching/reading content, number of mouse clicks on a particular content, engagement with portions of content, sequence of clicks, length of notes taken on a Segment of content, and various other motifs (motifs are elaborated below). These behaviors can be defined at various levels of granularity with respect to the course material, including the File level (e.g., percentage of a File completed, number of rewinds in a File) and the Segment level (e.g., percentage of a particular Segment in a File completed, number of rewinds measured in a Segment).

Figure 4:
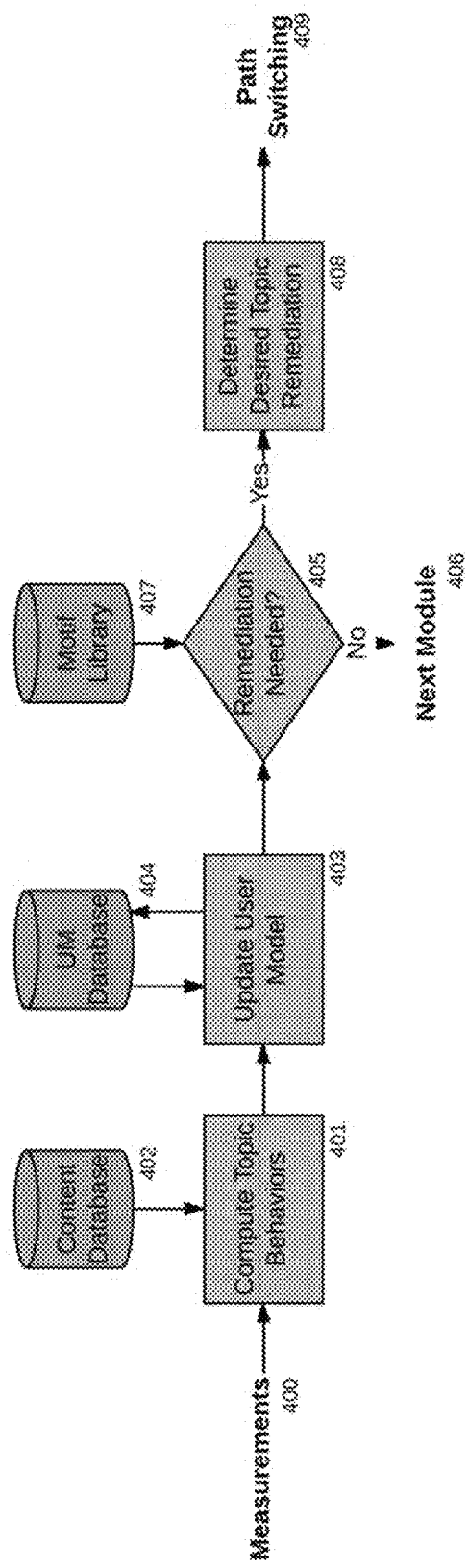
FIG. 4 specifies an embodiment of the User Modeling method of the present invention.

The components of the User Modeling 102 stage are depicted in FIG. 4. As a user interacts with content in the Player 105, several types of Measurements 400 may be collected and parsed so as to determine the student's overall strengths and weaknesses and specific positives and negatives relative to the topic material. In a preferred embodiment, the set of Measurements 400 collected by the Player 105 in FIG. 1 about each user includes, but is not limited to, the following:

a. Play, pause, stop, fast forward, rewind, playback rate change, exit, and any other video player events, as well as corresponding timestamps, durations, and any other information that specifies user interaction with a video player.
b. Page, font size, exit, and other text viewer events, as well as corresponding timestamps and durations that specifies user interaction with a text viewer.
c. Slide change, completion, button press, and other events triggered from viewing a set of slides, as well as corresponding timestamps and durations that specify user interaction with the presentation viewer.

d. Position and length of highlights placed on video or text at specific locations, or on a particular slide, where the video length is measured in time of video and the text length in number of objects from the starting position.
e. Position and content of bookmarks placed on video or text at specific locations, or on a particular slide.
f. Position and content of notes taken on video or text at specific locations, or on a slide, as well as whether these notes were either shared publically, shared with a specific set of users, or not shared.
g. Information on each post made in discussion forums, including its content, whether it was meant as a question, answer, or comment, and the number of up-votes it received from other users or the instructor. Discussion forum posts are analyzed using NLP techniques which are able to detect sentiment as well as if a post is a question or statement.
h. Submission, time spent, selected confidence level, and number of attempts made for each assessment submitted, as well as the points rewarded if the assessment was machine gradable.
i. Body movements, including eye movements, as observed by cameras and/or audio recording instrumentation.

FIG. 4 depicts a process flow for the User modeling of the present invention. Measurements 400 and Content Database 206 feed into computing topic behaviors 401. These behaviors and a User Model Database, housing various user models, 404, are used to update the user model (403). The updated user model 403 and a motif library 407 are used to determine if remediation is needed (405). If remediation is not needed, a next Module, File, or Segment is delivered to the student (406), where that next delivery is based on the updated user model and related sequencing. If remediation is needed, a determination is made as to which topic needs remediation 408 and the path is switched 409.

Each of the behaviors mentioned above are determined from these Measurements 400, and are associated with specific topics by mapping them to specific Segments (which are tagged with topics) through the Content Database 104. These behaviors can be grouped under the general umbrella term "motif". A motif, as referred to herein, is a sequence of actions that form a recurring pattern of user behavior. In a preferred embodiment, motifs can be either human-specified (e.g., by an instructional designer that has pre-defined sequences of actions in mind), or uncovered through Sequential Pattern Mining (SPM) techniques of AI. One example of a relevant SPM technique is Probabilistic Mixture Modeling, which assumes each subsequence is generated either by a motif model or a background model, where the background model captures the likelihood of observing each action outside of a sequence. This could be applied in this invention as follows. First, the behavior of each student would be represented as the sequence of actions and durations in between the actions; for example, a student may "play video from 00:00 for 30 seconds", then "skip forward by 45 seconds", then "pause video", then "view PDF page 1 for 15 seconds", then "view PDF page 5 for 50 seconds", and so on. Second, the number of times that each individual action occurs across students is counted, forming the background model; for example, the action "skip forward by 45 seconds from video position 00:30" may be found to occur 150 times. Third, each subsequence that occurs in the data is identified and its number of occurrences counted, forming a subsequence model; for example, the subsequence "play video from 00:00 for 30 seconds", then "skip forward by 45 seconds", then "play for 15 seconds", then "skip back by 30 seconds" may occur 20 times. Finally, the motif model is extracted from the subsequence and background models, by finding those subsequences that occur significantly often (from the subsequence model) and would be extremely unlikely to occur this often from chance alone (from the background model). For example, "play for 30 seconds" then "pause for 15 seconds" may not qualify as a motif if these two events are seen to occur often across students and thus could be generated by the background model, while "play for 30 seconds", then "pause for 15 seconds", then "skip back by 20 seconds" may qualify as one if it occurs regularly yet is very unlikely to see these three occur from the background model.

A technique called Multiple EM for Motif Elicitation (MEME) is also used to find similar behavior motifs from those pre-stored. At its core, the technique is based on expectation maximization algorithm. The EM algorithm assumes that a subsequence of the given behavior data is generated from one of two models, a background model and a motif model, and it introduces a hidden layer, Z, representing which model it is. The parameters of the motif model are in the form of an action-probability matrix, with each column being the probability distribution over all actions on a location of the motif. The background model is location-independent and therefore the parameters are simply a probability distribution over all types of actions.

The EM algorithm is comprised of an expectation step and a maximization step. In the expectation step, it uses the current parameters from the two models and the observed data to calculate the hidden layer. And then in the maximization step, with the resultant hidden layer, it recalculates the model parameters such that a log-likelihood value is maximized. The algorithm reiterates between the two steps, updating the model parameters and values of the hidden layer until the log likelihood measure is converged and the change is less then certain threshold. The identified motif is then extracted from the action-probability matrix of the model parameters.

Motifs that are indicative of the learning process—such as increases or decreases in knowledge transfer, improvement or declines in job performance, and/or preferences for certain content types—are particularly useful for User Modeling 102. Of course, motifs need to be particular to displayed information. In the context of the present invention, sophisticated algorithms are implemented to correlate motifs to learning improvement (or adverse improvement), such as by correlating motifs to test results and storing the results with the motifs. Using existing datasets, we have identified motifs that appear significantly often, at least in the sense of statistical significance or similarity, for students that will go on to answer particular questions correctly on their first attempt (CFA), and others that appear significantly often for students who will answer them incorrectly. At least at times, some of these motifs can cross multiple content types for a user (suggesting potential confusion, for example, across types of content, such as text vs. video). Because the questions have been designed to test comprehension, correct on first attempt answers are associable with learning success. One example is a series of behaviors which is indicative of students reflecting on a Segment or multiple Segments of content, which are significantly associated with correct first responses in a majority of datasets. As another example, we have identified motifs that are consistent with rapid-paced skimming through a Segment or multiple Segments of content, and have found that these are discriminatory in favor of incorrect responses on corresponding test questions in different courses. As another example, we have identified motifs that are indicative of low engagement across multiple Segments of content and have determined that they appear significantly more often amongst students who have measurably higher job performance after taking the course than they did before (for corporate courses). Improvements in job performance may be determined after the course using a set of criteria relevant to the learner but outside of the scope of the eLearning material. Incorporating the lengths (e.g., duration of play before the next event is fired) in addition to the events themselves is essential to identifying meaningful motifs, because motif extraction based solely on the sequence of events themselves would not reveal these insights (e.g., "play" then "pause" is ambiguous while "play for 30 seconds" then "pause for 15 seconds" is not).

In the present invention, then, the new behaviors for a user are used to update his/her User Model in the User Model (UM) Database 404, as shown in FIG. 4. Each user is modeled in terms of the motifs he/she exhibits in each Segment, and the statistical associations that these motifs have with learning outcomes and/or preferences. In a preferred embodiment, these associations are initialized independent of specific students based on an analysis conducted across a plurality of previously collected datasets (forming a "course baseline"), meaning the course baseline is updated based on each subsequent student, and a particular student's associations from previous courses ("student baseline"), and then are updated over time individually for each student in a course based on that student's observed behavior and resulting learning outcomes in the course. A number of machine learning techniques may be used to perform such an update. An example is shrinkage estimation, whereby the initial, student-independent association is brought closer to the real-time, student-specific association as more data points are gathered for this student relative to this motif, since an estimate is generally considered more trustworthy and less noisy when it is based on more samples. The real-time, student-specific association is based entirely on observations of this student exhibiting this particular motif; in this way, the estimate for a student displaying a motif 100 times will be closer to the real-time value than if it was displayed 10 times.

The numerical values of the associations between motifs and the learning outcomes, whether student-independent or student-dependent, can be established by techniques such as linear or logistic regression, depending on whether the outcome is real-valued (e.g., number of points obtained on a quiz) or binary (e.g., whether a question is answered correctly or not). Also, these associations need not be based on single motifs; a set of motifs where each motif is executed in close proximity to one another can be modeled in terms of their joint effect.

The last component of User Modeling 102 as shown in FIG. 4 is to determine whether Path Switching 103 should be executed or not. In an embodiment, Path Switching 103 is executed as soon as a student's motifs show enough evidence of learning efficiency or inefficiency. This may be, for example, once a student has exhibited enough motifs (or enough of a motif score) such that their learning outcome is expected to drop by 10% or more. In an embodiment, the different variations will be stored in a Motif Library 407 database so the current User Model can be compared with them. If Path Switching 103 is needed, the invention will determine the topic composition of the material that the student is struggling with, called the Desired Topic Remediation 408 in FIG. 4. In a preferred embodiment, this would be a detailed mathematical composition based on the Segments at which points the motifs were detected. Since the topic distributions of the Segments have already been determined in the Content Tagging 101 stage, this can be accomplished by combining the distributions of those Segments together into a single distribution, for example, by finding the average of them. In one embodiment, once the threshold is crossed, the present Segment may be halted and a replacement Segment may be started for the student. In one embodiment, the specific topic where a threshold is crossed can be identified and that portion of the Segment repeated.

In general, there could be an infinite number of possible Desired Topic Remediations 408. In a preferred embodiment, for purposes of pre-computing certain attributes related to each distribution in advance, there is a finite, preset number of groups into which the distributions would be clustered. In runtime, then, a user's Desired Topic Remediation 408 is assigned to its closest group.

The next section will cover the concepts related to Path Switching, the third and final component of the Individualization System 100.

Path Switching:

With Content Tagging 101 and User Modeling 102 established, the final stage shown in FIG. 1 is Path Switching 103. At a high level, this selects a sequence of segments that have a high likelihood of making the learning process more efficient based on the User Model. These segments are selected in part based on the topical breakdown of segments available from the Content Tagging 101 stage.

For example, suppose a student accesses a quiz and gets two of the questions incorrect. Intuitively, incorrect responses should qualify as motifs. Subsequent incorrect responses is one of the simplest types of motifs and are associated with negative learning outcomes, and if the cumulative effect is significant enough, this will trigger Path Switching 103. In one embodiment of the present invention, if the student has exhibited enough behavior correlated with a negative learning outcome there may be no need to move forward to administer a quiz. However, in the case where the quiz is administered, obtaining the topic distributions for the content the user is struggling with is a matter of querying the Content Tagging database 104 that contains the topic distributions for all segments in the course. The database returns to the processor the topic distributions for each question, so two topic distributions in this example for each of the two questions that the user answered incorrectly, which can then be used to determine which content to build for the student. This content could then be served up immediately, or as soon as the student has finished the quiz. The number of topic distributions varies based on the behavior trigger, so it is important to note that the number of distributions could range from 1 to many. The distributions can then be averaged or otherwise operated upon mathematically to come up with one composite distribution summarizing what the user is struggling with.

As another example, suppose a student has moved through a content File rapidly. The User Modeling 102 may characterize this behavior as a motif of low engagement, again triggering the Path Switching 103. To obtain the topic distributions in this case, the invention would determine the Segments that elicited low engagement, and would query the Content Tagging database 104 for the topic distributions of these specific Segments. If the Segments were limited to paragraphs in a PDF document, for instance, then which Segments were in the motif would use knowledge of the page location in the PDF where the behavioral trigger occurred. The content, from the original File or an alternative, could then be served up immediately upon detection of the motif, or as soon as the student proceeds past the current Module. Of course, one may imagine that the reason for this behavior was due to the student believing the material is redundant. If that was the case, this motif would not be negatively associated with learning outcomes for this learner in the first place, i.e., it would not count as a trigger. If this behavior was detected to result in a drop in outcome in prior cases, however, it will count as a motif, and will trigger Path Switching 103.

Path Switching 103 step is broken down in FIG. 5. FIG. 5 depicts a flow chart of Path Switching in one embodiment. Desired Remediation Topic 500 and Content Database 206 are used to select remediation segments 502. Based on content type, an aggregate content set is selected (text-based, 503*a*, audio, 503*b*, and/or video, 503*c*) is arranged and a remediation module is constructed 504 and sent to Player 105. Equipped with the Desired Topic Remediation 500 distribution summarizing the topics that the student is currently struggling with, the Path Switching 103 must then determine the set of content (Remediation Segments) that the student will be shown next, and the sequence in which those Segments should be presented.

To do this, the system of the present invention ascertains the utility of showing the user a given sequence of Segments. Utility scores are created and updated over time for different possible sequences of Segments ("candidate sequences"). In a preferred embodiment, this utility score is based on at least three component scores (but could include more) that, in part, determine the effectiveness of this content at improving the specific user's outcomes at this specific point in time: a similarity score, a distance score, and a historical score, which may be adjusted with new observations via reinforcement learning techniques and machine learning.

Before discussing methods for defining and updating these scores, note that in general, the number of possible candidate sequences could grow exponentially with the number of Segments for the course. In a preferred embodiment, several practical considerations are used to reduce the associated computational burden. First, the number of Segments comprising a given sequence can be treated as a parameter that never becomes larger than a few (e.g., 5). In a preferred embodiment, this parameter is adjusted over time on a per-user basis, by observing the utility of given sequence lengths. For example, getting a single question wrong might queue up a three paragraph PDF for one user but a five paragraph PDF for another, whereas skimming over content in a Module might queue up a one paragraph of PDF and two minutes of video for one user, but three minutes of video for another, depending on, for example, a priori knowledge of the student's skills, learning style, etc.

Second, in most embodiments, while questions are considered "Segments" for the purpose of topic modeling in the Content Tagging 101 stage and for updating a user's behavior in the User Modeling 102 stage, they generally are not used as potential segments in candidate sequences for Path Switching 103. The reason for this is that they are generally meant as assessment tools rather than learning material.

Third, permutations among a given set of Segments need not be considered separate sequences. In particular, for each File type in a candidate sequence, it can be assumed that the Segments should be ordered based on how they appear chronologically (per the syllabus or equivalent) in the course. For example, a sequence consisting of "Segment 1 of File 3 (video)", "Segment 2 of File 1 (PDF)", "Segment 5 of File 2 (video)," and "Segment 2 of File 5 (PDF)" would be grouped/ordered as: "PDF: Segment 2 of File 1, Segment 2 of file 5", and "Video: Segment 5 of File 2, Segment 1 of File 3." Then each group is rendered according to its File type, and each group is delivered to a student as multiple Files within a Module (or within multiple Modules). This designation is intuitive since learning material naturally builds upon itself, i.e., an earlier Segment may be needed to understand a later Segment.

Fourth, only Segments through the current course Module are considered. Segments appearing beyond the Module in which Path Switching 103 was executed may contain more advanced versions of content that the user is not yet prepared for.

Fifth, in an embodiment, only Segments that have similar topic composition to the Desired Topic Remediation 500 are considered. Others may be deemed as irrelevant and therefore a distraction or harmful to the remediation needed here. Topic similarity is calculated in the same manner as the similarity score that will be described next. Using a more aggressive threshold on similarity has the potential disadvantage of excluding Segments that do not cover the same topics but could serve as useful reminders.

Sixth, to the extent necessary, Segments of the same type can be combined into larger groups and treated together. Two sequential paragraphs, for example, might be treated as a single Segment for the purpose of Path Switching 103, as may two sequential video chunks.

With the above (as well as other) considerations, the set of possible candidate sequences for each Desired Topic Remediation 500 can be reduced to a computationally manageable level. Even in courses with several hundred Segments, the ability of precomputation of Segment permutations allows the Path Switching 103 module to operate in a performant manner that prevents the learner from knowing that any changes had been made to the course.

The next step is the calculation of the similarity, distance, and historical scores for each candidate sequence.

The similarity score quantifies how similar topics contained in the candidate sequence are to topics that the student is struggling with by comparing (i) a distribution that represents the topics contained in the candidate sequence with (ii) the distribution of the topics being struggled on. Procedures to obtain (ii) have been described previously, and (i) can be obtained through similar techniques, for example, by finding the average distribution over the Segments. The comparison can then evaluate the similarity between two topic distributions, such as Total Variation Distance (TVD) or Kullback-Leibler Divergence (KLD). The value can be defined to range between 0 (no similarity) and 1 (completely similar, i.e., identical). After comparing topic distributions for the review Segments and all other Segments, the system has a data structure containing each candidate sequence's similarity to the Desired Topic Remediation.

In addition to similarity, the distance between segments is a useful metric for evaluating the quality of each candidate sequence. The distance score quantifies the cohesiveness of the Segments in the candidate sequence, i.e., how well one can expect that the segments logically "flow" from one to the next. This measure leverages the logical progression of human thought that an instructor uses in creating a course: segments in the syllabus should flow from one to the next, like the paragraphs on this page. Candidate sequences comprised of Segments which appear in close succession in the original syllabus will provide more value than Segments selected from several distant locations in the syllabus, all else held constant (i.e., all segments are actually relevant to the desired remediation). One could see the difference in these two scenarios as finding the location where a concept is explained versus compiling several locations where the concept is mentioned. Several techniques can be used to make such a determination. One simple yet effective technique is counting the number of neighboring Segments in the candidate sequence that each is also neighboring in the original course material. For example, suppose the course consists of 1,000 Segments, ordered 1, 2, . . . , and a candidate sequence is composed of Segments 10, 20, 21, 22, 35, 36, 60. Out of seven neighboring pairs in the candidate sequence, three (20 and 21, 21 and 22, 35 and 36) are neighboring in the original course, so the fraction 3/7 could be taken as the distance score in this case. Another technique factors in the actual distance between Segments in the candidate sequence, with increasing penalty for further distance. In the above example, for instance, the first pair 10 and 20 may get 1/(20−10)=1/10, the second 20 and 21 would get 1/(21−20)=1, and so on through the last pair 36 and 30 which would get 1/(60−36)=1/24, for a total score of 3.22/7. The distances could be penalized in different ways, too, so that even far-away Segments are still counted more than a non-negligible amount.

It is also possible to incorporate similarity into the distance score, to further increase the probability that groups of neighboring Segments with high similarity scores to the Desired Topic Remediation 500 are shown in remediation to the learner. For example, suppose one Segment has a similarity score of 0.75. If its neighboring segments have similarities of 0.25, then this group of Segments should have a higher overall score than if the neighboring Segments only had similarities of 0.1. Topics are discussed in successive Segments, so the processor of the present invention is configured to prefer successive Segments with high scores over single Segments with high scores and low scores surrounding. This helps the processor decipher a summary Segment for a topic versus where the topic is explained. To compute the distance measure in this case for a single Segment, the system can calculate the sum of the similarity of all other Segments divided by the distance of that Segment to the Segment of interest. In this way, Segments that are close to the Segment in question have a higher weight in determining the distance measure than Segments that are far away.

Note that, in constructing the complete set of candidate sequences, the system uses the ordering provided in the Segment names, but adjusts that based on content type, considering each File separately. For example, if there are two content types, in considering each one of them, Segment indexing may be set such that they are contiguous for this content type. This prevents gaps between indicia which would increase the probability of Segments within the same File being shown based on the distance measure simply because they are "closer" to one another than Segments in another File. There are multiple parameters that can be tuned in this calculation which allow the system to increase or decrease the importance of the distance measure, as well as change how the distance weighting is distributed. Other methods to achieve this goal have also been devised and tested in the system.

In a preferred embodiment, the historical score is a measure of how effective the candidate sequence has been for learners exhibiting these triggers in the past based on at least two aspects: (i) the average benefit of the sequence, and (ii) the number of observations this benefit is based on. If several previous learners have shown no improvement in their user model after being shown a certain candidate sequence, then the historical score is very low (e.g., −1.0). On the other hand, a high historical score (e.g., +1.0) indicates that the candidate sequence is an effective prescription based on that particular user model. In an embodiment, before any observations are made, the historical score is initialized at a neutral value (e.g., 0.0) so as to not impact the overall utility measure until information is gathered. With observations on the candidate sequence, the historical score is permitted to take on more extreme values. The maximum range of values preferably is larger than those of the other scores, because with enough observations in one direction (i.e., highly effective or highly ineffective), the historic score should override measures of utility made by topic analysis.

Note that unlike the historical score, the similarity and distance scores for a given candidate sequence only depend on the particular Desired Topic Remediation 500. In a preferred embodiment, then, for each possible Desired Topic Remediation 500 (recall that a pre-defined, finite set can be specified), the utility score can be initialized for each possible sequence in advance, thereby minimizing the computation necessary during runtime. In adding the various scores together, they may be weighted differently in order to properly calibrate them, and possibly to place more emphasis on one versus another. This process is outlined in FIG. 6: for a given Topic Remediation 500, the sequences 603 are enumerated, and the Score Presets 604 specify how the scores should be aggregated. This can be done in an offline manner, and once computed, the initial utility computation values 605 and scores 607 are stored in the Sequence Utilities 606 database. Item 608 shows the highest score.

Figure 7:
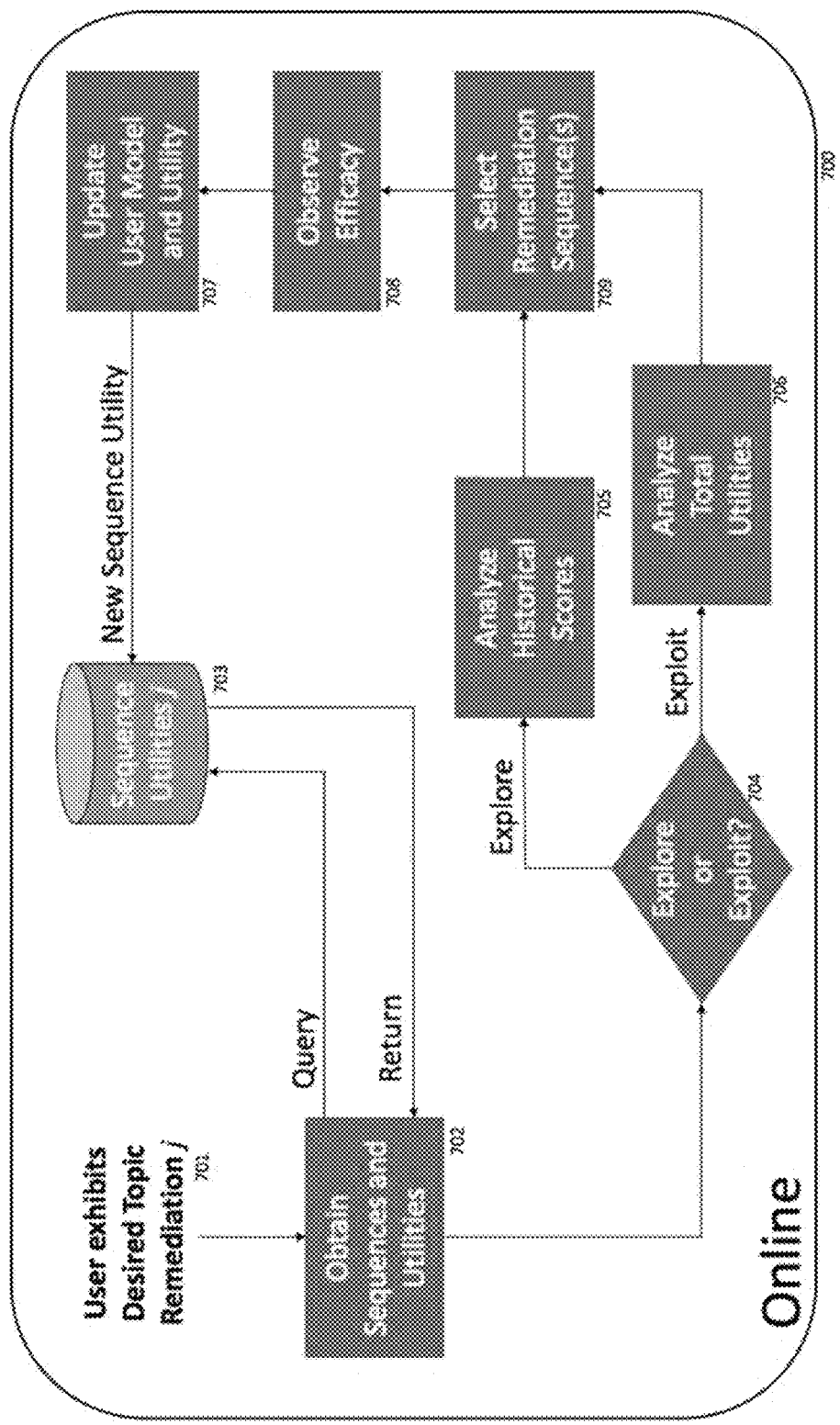
FIG. 7 illustrates an embodiment of the process of updating the utilities associated with a candidate sequence over time in an online manner.

FIG. 7 depicts an embodiment of the process of updating the utilities associated with a candidate sequence over time in an online manner 700. In the process, a User exhibits Desired Topic Remediation j (701). In the process, Sequences and Utilities are obtained 702, iteratively from Sequence Utilities database 703.

FIG. 7 shows how the utility values will be updated in an online manner 700 as the historical score is updated. In order to update the historical measure over time, one decision to be made is what exactly constitutes an "effective" as opposed to an "ineffective" observation; there are a number of possibilities for this. In one embodiment, the difference would be the amount of improvement shown in the user model after visiting the candidate sequence, or a binary measure of whether it is expected to improve at all or not. In another embodiment, the difference is tied to subsequent behavior or performance in the course, for example, whether the learner answers the next quiz questions associated with these topics correctly, or whether the learner exhibits the same motifs that showed signs of necessary remediation in the first place.

For example, suppose a candidate sequence was triggered four times at a particular point in the course by four different learners showing struggle with Topic A (in reality, it may be a combination of multiple topics, one is assumed here for simplicity). The next time Topic A is covered, the learners' behavior indicates changes in learning outcomes associated with Topic A: +4, +6, −3, −3, which average to +1. Suppose also that the system views 10 observations as a stable number of observations for the historical score; then the +1 may be scaled by 4/10 for a score of 0.4.

In an embodiment, the historical score of a candidate sequence at a particular point in the course may differ by user. The method of the present invention may factor in prior users' experiences with the candidate sequence differently depending on how similar they are to the current user. This similarity (different from the topic similarity score described previously) is determined by comparing prior behavior of users in terms of which other sequences in the course have been associated with effective/ineffective outcomes for them. For example, suppose two users A and B have prior candidate sequences in common. On these sequences, the association with successful outcomes for A turned out to be "Yes, No, Yes, No, No, Yes" while that for B was "No, No, Yes, No, No, Yes". Since these users only differ by one, A and B are considered to be similar, so B's outcomes on future candidate sequences would have a larger bearing on A's historical score than, say, another user C who had "Yes, Yes, Yes, No, Yes, No", differing by 3. This is a simple example of a collaborative filtering method of machine learning, which could be made more sophisticated as well.

The current historical scores are held within the Sequence Utilities 703 database of the system shown in FIGS. 6 and 7 on a per-remediation basis (i.e., for each separate Desired Topic Remediation j 701), and incrementally updated as new learners access the course. A determination is made wither there is a need to Explore or Exploit 704. If Explore, historical scores are analyzed 705. If exploit, total utilities are analyzed 706. Either way remediation sequences are selected 709, efficacy is observed 708, and the User Model and Utility are updated 707 and any new Sequence Utilities are stored in Sequence Utilities database 703. With each of the three scores—similarity, distance, and historical—calculated, the system can combine them together at any point in time for a total utility score. This provides the system with a final score measuring how effective each Segment is at helping remediate the behavior at hand, and with it, the system now has the information necessary to select candidate sequences to show.

In a preferred embodiment of the Path Switching 103 stage, the system employs a reinforcement learning technique to select the candidate sequences, choosing either exploration or exploitation each time a remediation is desired based on a particular behavior. This process is illustrated in FIG. 7. In this context, exploitation would be assigning the sequence or sequences that are the best by current estimates for a learner exhibiting this behavior, while exploration preferably is assigning a sequence or sequences for the purpose of making more observations about them with respect to this behavior. Each time Path Switching 103 is invoked for a behavior, exploitation preferably is chosen with a certain probability, else exploration would be used. In an embodiment, the probability of exploitation attached to each behavior increases as more observations for that behavior are made, because the chance of having already identified the optimal candidate sequence for the user model in question is higher.

When exploitation is chosen, in an embodiment, the candidate sequence(s) that preferably are prescribed are those with highest total utility scores. When exploration is chosen, in an embodiment, the prescription favors those with lower numbers of observations (as reflected in the historical score) and higher utility scores. Having the set of possible candidate sequences initialized based on the highest similarity and distance scores in the first place reduces the risk of exploration ever choosing sequences that are completely irrelevant to what the user needs remediation on.

Figure 8:
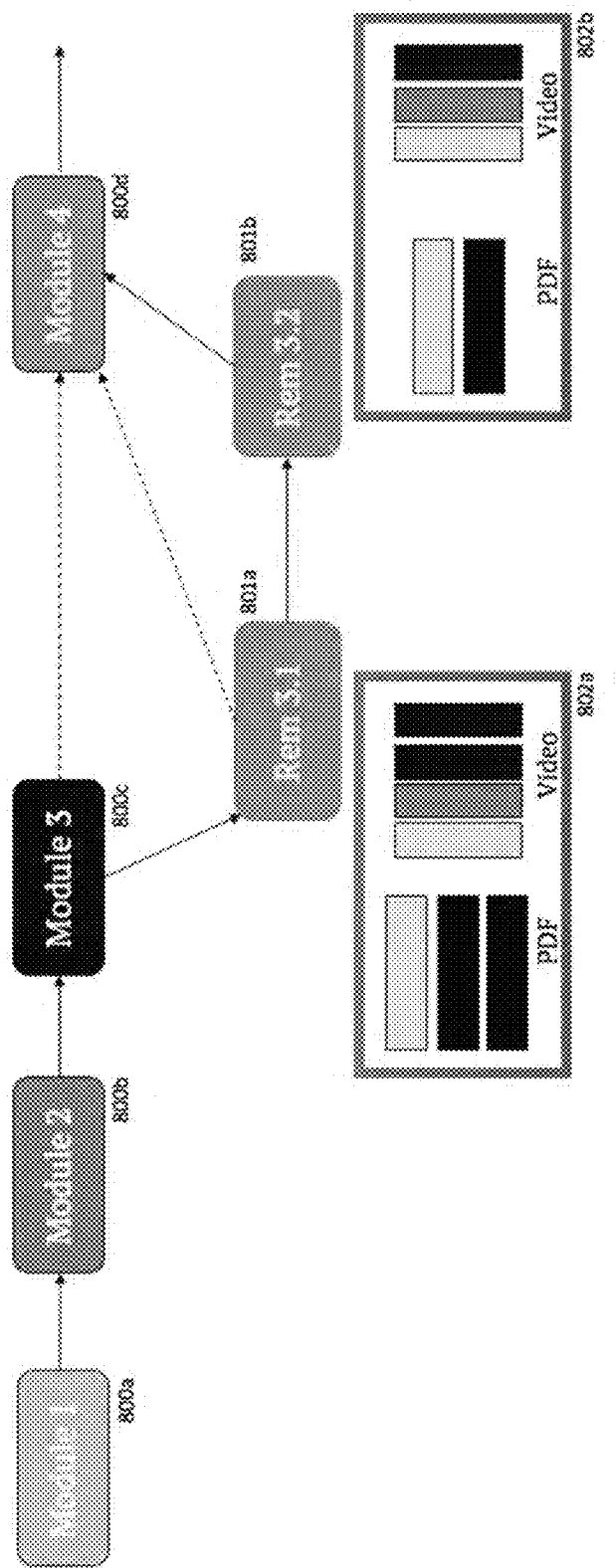
FIG. 8 gives an example of remediation Modules consisting of content segments being inserted within the original course sequence.

Recall that the non-adapted version of the course is delivered as a sequence of Modules. In an embodiment of the present invention, when the Path Switching 103 is triggered from within a given Module, the user preferably is brought to a separate Module that displays the candidate sequence (or sequences) to them. Once the remediation is finished, the user is brought back to the Module at the spot where they left off. An example of this is shown in FIG. 8, where Path Switching 103 has been triggered at the conclusion of Module 3 800*c*: the Player 105 brings the user to two remediation sequences (Rem 3.1 801*a* and Rem 3.2 801*b*) before the user is brought to Module 4 800*d*. Like the default course Modules, the remediation Modules are not limited to the types of content they can include: if the course contains video and PDF content (802*a*, 802*b*), then each remediation may consist of either or both of these, depending on the candidate sequences.

With knowledge of all the Segments that will be included in each remediation Module, the system then retrieves them from Content Database 104. If the Module has already been delivered to a user previously, then all the files comprising the Module will already have been created and stored in the Content Database 104 in FIG. 1; in this case, the Files are simply retrieved from the database and delivered. For each File that has not yet been created, the system will proceed to do so as follows: the video and audio Segments which were spliced previously are indexed by their name from the topic distribution database, as are text Segments. Based on the content type, the system performs a file building step. For audio and video Segments, the system uses a multimedia framework to piece together the Segments that have been matched for the behavior; for example, four matched 30-second audio Segments are converted into a single 2-minute audio File. For text content, based upon the content type of the origin of the text, the Segments are pieced together into a new File. For a PDF, the Segments are programmatically added to a document in succession. For a slide or interactive media, the Segments are programmatically placed in succession using the template from which the content came from. For text-based content creation, the system also places referenced images in the Files as well: this is done by observing the text and searching for any references or links to an image. If one is found, the system indexes the accompanying image based upon the filename given in the initial preprocessing in the course, and the image is then placed with the respective Segment in the File. Once the Files for a remediation Module have been created, the system stores them with the rest of the course content in the Content Database 104, with unique identifier which represents the Segments that exist within the content and their sequence.

In a preferred embodiment, the system also includes a caching mechanism that stores frequently retrieved Files on the user Player 105 device. This will enhance the user experience as the Player 105 will not be required to retrieve the same File from the Content Database 104 repeatedly, thereby minimizing delay involved in fetching the content. Cached Files may include Files that are frequently served up for a particular user, or those that are predicted to be served up based on behavior of past users.

After the system created or indexed content to show the learner in remediation, Player 105 in FIG. 1 receives a request from the Individualization System 100 to redirect the user to the remediation Module. After finishing this Module, or after a preset amount of time, the user may be brought directly back to the original sequence. Alternatively, the system may prescribe additional assessments based on the remediation content and/or the behavior which triggered the Path Switching 103 in order to determine the efficacy of the remediation Module, and more specifically, the remediation Segment selection and sequence for the user.

Figure 9A:
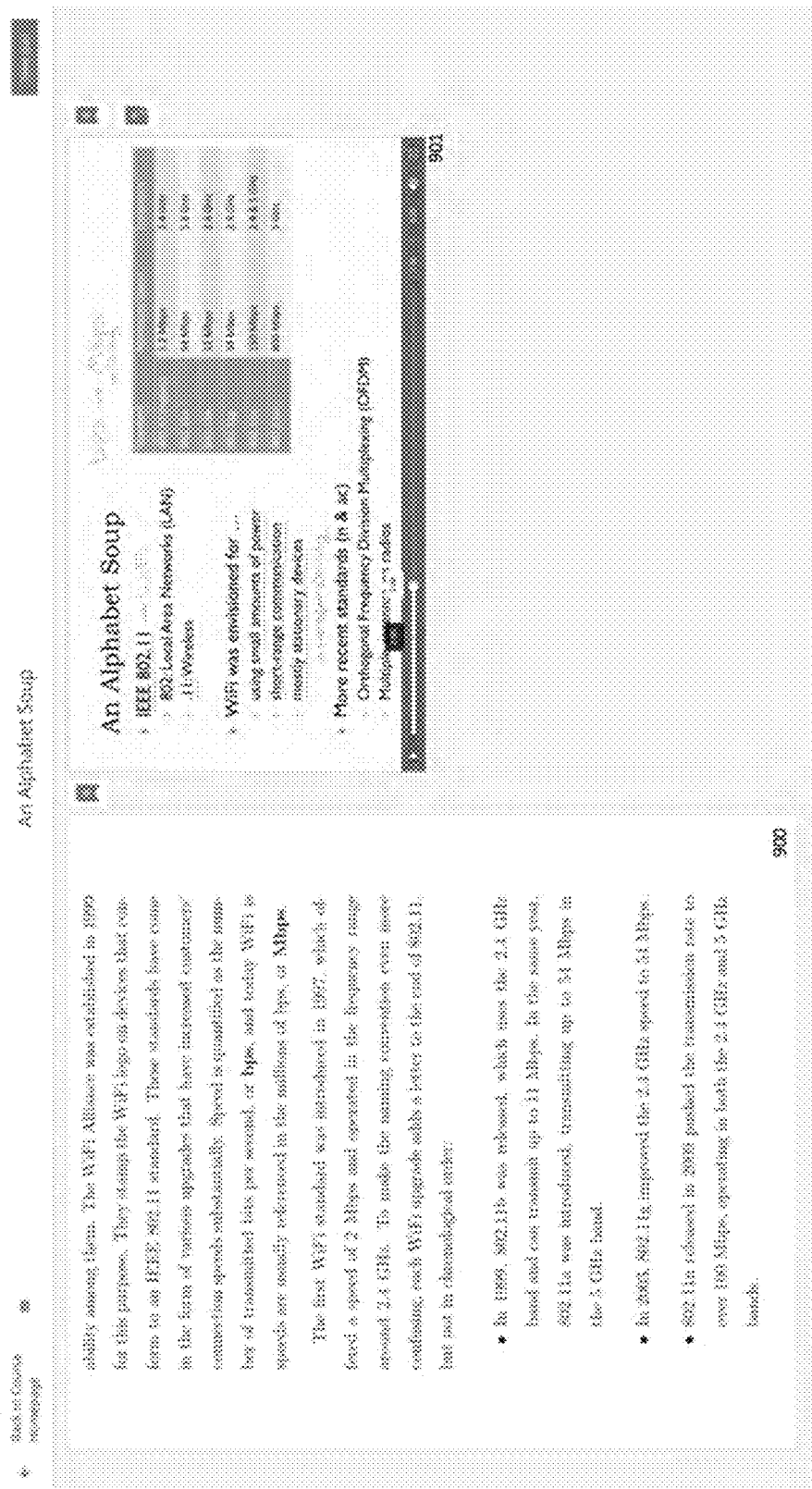
FIG. 9A shows a graphical user interface displaying an original course Module for a student in the Player, in an embodiment of the present invention.
Figure 9B:
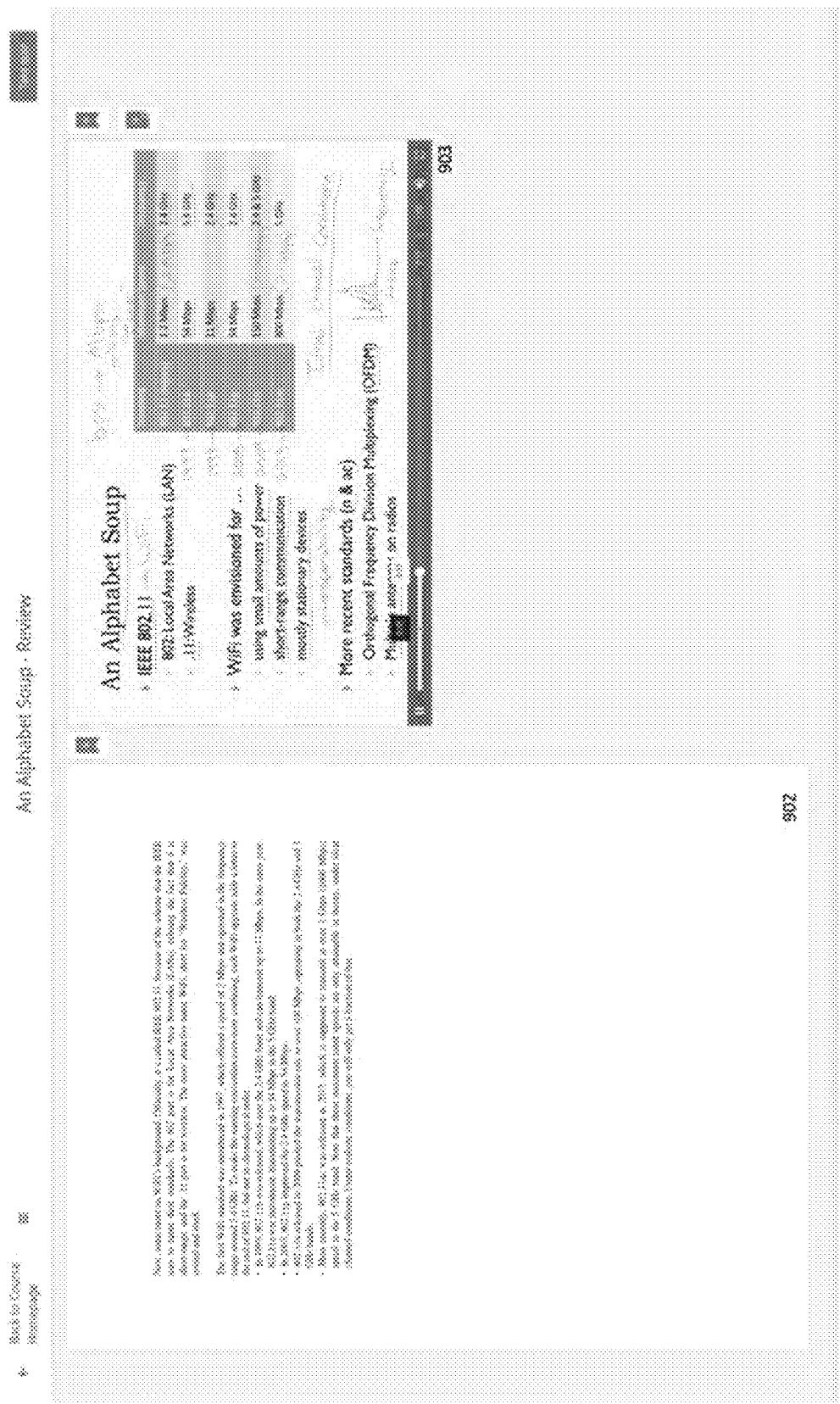
FIG. 9B shows a graphical user interface displaying a remediation Module for a student in the Player, in an embodiment of the present invention.

FIGS. 9A-9B give examples of the Individualization System 100 modifying the GUI for remediation in an embodiment. FIG. 9A is an original course Module (titled "An Alphabet Soup") and FIG. 9B (titled "An Alphabet Soup—Review") gives an example of a remediation Module generated for a user based on his/her User Model at the end of the course Module. Both cases contain both video and PDF files, but the remediation Module contains far fewer Segments than would be expected of a Module in the original course content.

In a preferred embodiment, the content used for individualization in the system is not confined to what is contained in the original, non-adapted course. Files external to the course may also be pulled in and delivered through the Player 105, depending on the access provided to the Individualization System 100. Sources of external content could include, but are not limited to, other Files on the system intranet, such as other courses being hosted by the same institution, and content on the Internet, such as HTML pages that can be accessed through a public URL. Types of external content include, but are not limited to, videos, articles, journals, online books, encyclopedia references, and any other type of information. In FIG. 1, this type of content is represented by the External Database 106.

Figure 10:
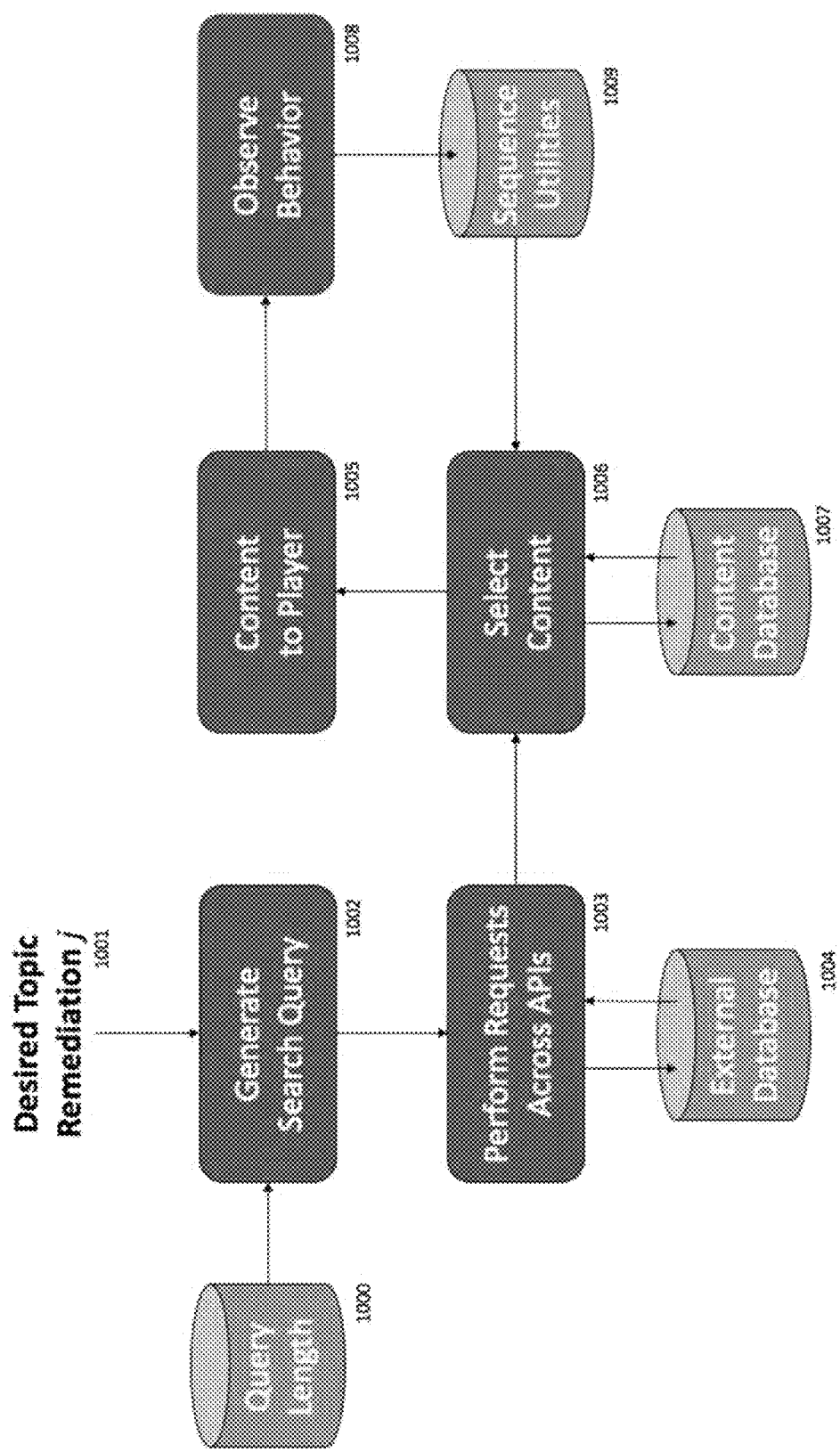
FIG. 10 specifies an embodiment of the external content retrieval method of the present invention.
Figure 11:
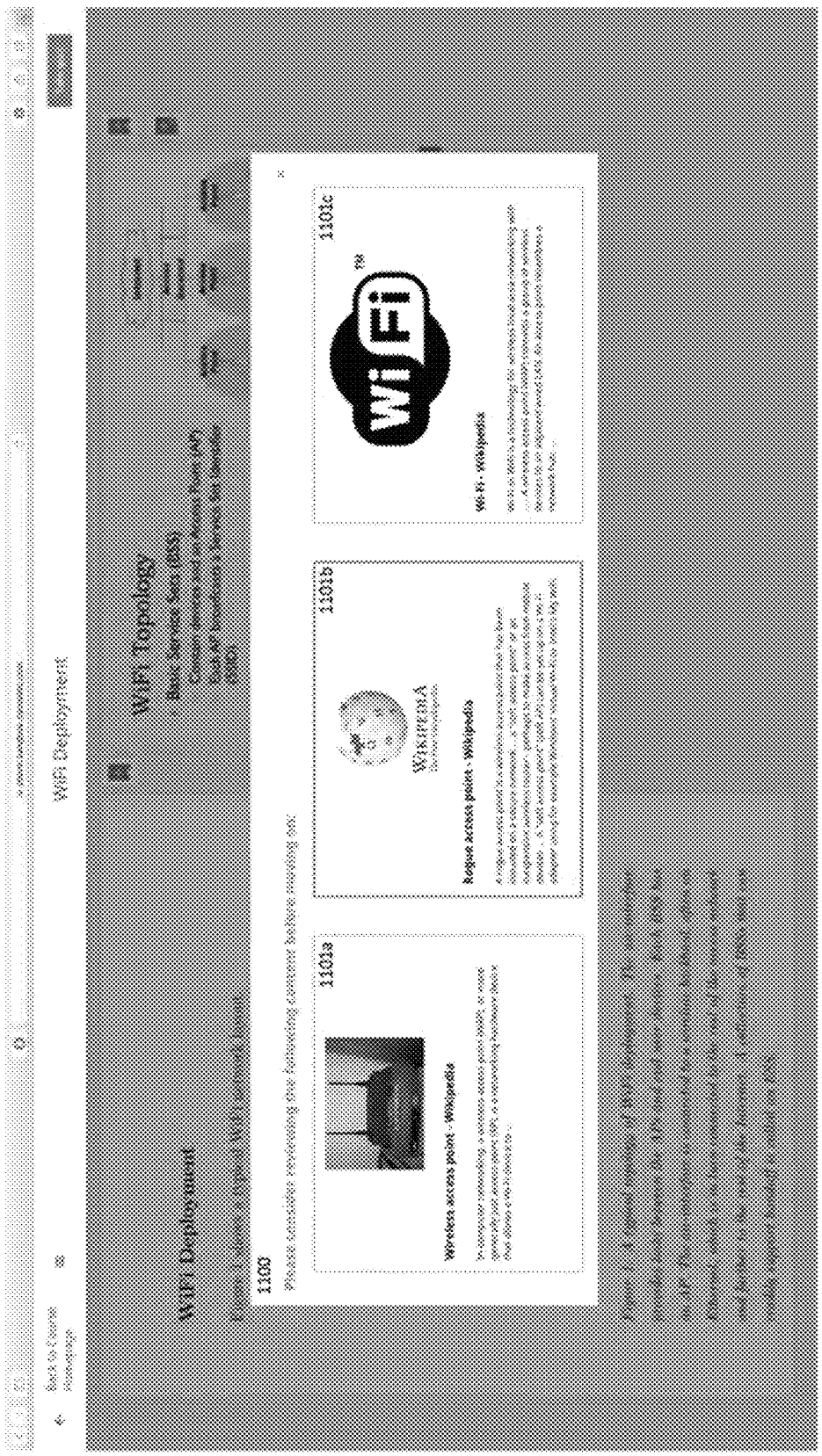
FIG. 11 shows a graphical user interface displaying links to external content to a student in an embodiment of the present invention.

FIG. 10 shows an embodiment of External Content Retrieval in the present invention. External content is sourced for potential use during the Path Switching 103 stage; in other words, it adds additional possibilities to remediation material. FIG. 10 depicts an embodiment of the external content retrieval method of the present invention, the Desired Topic Remediation 500 and Query Length 1000 are used together to Generate Search Query 1002. Request 1003 is then made across all available APIs reaching one or more external databases 1004. Content is selected 1006 and both stored in Content Database 206 and is sent to Player 105 in step 1005. Behaviors are tracked and observed (1008) and those behaviors are sent to Sequence Utilities (here marked as step 1009 but analogous to earlier figures). There are at least two methods for handling the delivery of external content through the Player 105. First is to treat it as a separate type of File that will be delivered to the user during remediation, either concurrently in the same remediation Module as the course content or in a separate Module. The Player may invoke a web browser to display those pages external to the main course application; a GUI 1100 corresponding to this case is shown in FIG. 11. Second is to download each external piece of content, store them in Content Database 104, and pass them through the content ingestion process where Files are broken apart into Segments. The external Segments can be grouped together with the original course content and candidate sequences can be created consisting of both types.

In an embodiment, the system retrieves relevant external content using search engines. The search terms input can be generated using the topic composition of the Desired Topic Remediation 500 that triggered the Path Switching 103 for the user. Recall that in a preferred embodiment, each topic is a made up of a probability distribution over words; the system uses these distributions together with the topic distributions in a document to determine the top words associated with what the user is struggling with. For a simple example, suppose there are three topics A, B, and C and four words, and the topic distributions over words are A: <0.2, 0.3, 0.2, 0.3>, B: <0.2, 0.1, 0.1, 0.6>, C: <0.4, 0.4, 0.1, 0.1>. Now suppose the distribution over topics associated with user struggle is <A: 0.3, B: 0.5, C: 0.2>. Then the word proportions are W1: 0.2×0.3+0.2×0.5+0.4×0.2=0.24, W2: 0.3×0.3+0.1×0.5+0.4×0.2=0.22, W3: 0.2×0.3+0.1×0.5+0.1× 0.2=0.13, W4: 0.3×0.3+0.6×0.5+0.1×0.2=0.41. Thus, the ranking from highest to lowest is W4, W1, W2, W3; so, if two words were to be chosen for a search, it would read "W4 W1". The number of words in the search query can also be a tunable parameter, which would be stored in the Query Length 1000 in FIG. 10; this would generally range between 5 and 10, based on query specificity.

Alternatively, with knowledge of how many words should be in the search, the system could employ a method of sampling from the topic distributions to generate the terms. In this case, the sampling would be weighted first by the topic (i.e., those topics with more proportion of what the user is struggling with are more likely to be selected) and then by word within the topic (i.e., those words with more proportion in the chosen topic are more likely to be selected). This sampling procedure would be repeated once for each search term needed.

Once the search term is generated, the system is then able to make the necessary query. For obtaining external content on the world wide web, the system could make use of Application Program Interfaces (API) that are available for most common search engines, for example, Google Search API or YouTube Search API. In a preferred embodiment the system would customize the use of these APIs to target specific content and sources more heavily: for example, the system may prefer Wikipedia articles from a Google Search over other sources deemed less reliable. For content on a private intranet, the servers' internal file search functionality may be used.

The system must also specify the number of results that should be returned from each search engine. Typically, an API will provide the results in a ranked order of relevance and importance to the query. So, if N pieces of external content are desired, then obtaining the first N results of the output could be sufficient. However, in a preferred embodiment, for each of the results returned, the system will evaluate its potential of remediating the topic at hand before processing it in the Content Database 206 for the course or showing it to a user. This can be important in case the search functionality returns some results that may be important for search engines but not for educational purposes (e.g., related pages that are visited frequently). The evaluation here could be based on the similarity score calculation between the distributions of (i) what the user is struggling with and (ii) the specific search result; if this is above some threshold, then the result will be taken, else it will be discarded and the next one tested. Since a search API will return metadata including the title and usually a textual description of the result, the topic composition of (ii) can be determined by analyzing this information. Alternatively or additionally for (ii), the system could scrape the content on the page and perform topic analysis on the full content, passing it through the content ingestion process that is applied to each File in the course. If this external File will be used as course content moving forward, it must be processed and stored in the Content Database 206 anyway. Further, the system may also use the number of shared words between (i) and (ii) to determine the magnitude of similarity.

If an external content File is stored in the Content Database 206 and broken into Segments, the system can begin incorporating the Segments into candidate sequences. Then the similarity, distance, and historical scores can be computed for these sequences as before, which would be tracked in the Sequence Utilities 1009 database in FIG. 10. The distance scores between internal and external content can be assumed to be 0, so that mixing types must have stronger similarity and historical scores to compensate. Based on subsequence observations of behavior in the Player 105, the Sequence Utilities database 1009 can be updated for the Desired Topic Remediation accordingly, as is done for internal content.

For external content that is not broken down and delivered through the Player 105, i.e., that which is displayed through a browser, the entire File can be treated as a candidate sequence. The disadvantage to external content displayed through a browser is that the behavior of a user on that content cannot be captured. Historical measures tied to whether certain behaviors are exhibited during remediation are therefore not applicable. However, aggregate measures such as total time spent and total number of clicks to that browser page can be tracked. Total time spent is based upon the timestamp when a user clicks on the content, and how long the Player window remains in the background thereafter before returning to the internal content. The behavior after returning to the internal course content can be tracked, too.

The invention claimed is:

1. A method for a processor-based server in communication with at least one data store and a multimedia interactive student graphical user interface (GUI) operating at least in part on a student's workstation; said GUI configured to capture student actions and an associated time factor for each action for delivery to said server; to select and deliver interactive student-customized on-line course modules to said GUI, module delivery customized based on a student's determined understanding of delivered content, said content absent assessment modules, said customization occurring during course delivery, comprising the steps of:

with an engine for processing sound, image, and natural language, identifying learning concepts in a module by tagging content words and topics based on their frequencies in each said module, storing said tags in association with a corresponding module and associating said modules with said frequencies of terms in a course syllabus;

formulating motifs from behavioral data of prior students, each said motif including a sequence of student actions together with associated time, said motifs formed using a probabilistic mixture model wherein each position in a motif is described using at least a mixture of (1) a position-dependent motif model where each position is described as a multinomial distribution specifying one or more probabilities and (2) a position-independent background model where each position is described as a multinomial distribution specifying character occurrence independent of position, and said formulating further including a maximum likelihood estimation with an expectation-maximization algorithm to maximize the expectation of the joint likelihood of the mixture model;

associating said motifs with said learning concepts using said tags;

further associating said motifs with student understanding by algorithmically extracting similarities between prior user behavioral data and assessments by using collaborative filtering, thereby forming motif vectors;

storing said motifs and motif vectors in said at least one data store;

relative to a particular student, delivering a first course module in a sequence of modules, said sequence reflecting a full course, to said GUI, said module retrieved from said at least one data store and including at least one of text, video, and images;

during on-going delivery of said first course module, said GUI capturing all student actions and associated times, said server receiving said captured student actions relative to said delivered portions of said module and associated times;

formulating an individual student vector for a particular student, said individual student vector initially formed as a user model for said particular student, said individual student vector modified based on the particular student's behavioral data on-goingly as the student progresses in a module, said student behavioral data including actions and associated times;

comparing said individual student vector for said particular student with said motif vectors in said data store to form a predictive understanding of the particular student by forming a file-to-file similarity matrix and using said matrix in a supervised learning algorithm to mathematically determine a best match between said individual student vector and said motif vectors;

based on said best match, selecting alternate content as appropriate for said particular student; and during on-going module delivery, replacing content in a not yet delivered portion of the course with said alternate content in consistency with said best match;

wherein said module is delivered on demand.

2. The method of claim 1, wherein said tagging is achieved using at least one of natural language processing, text to speech, and optical character recognition.

3. The method of claim 1, wherein delivery of said first course module halts based on an identified student knowledge gap, and said processor selects and delivers a second course module aligned to said identified knowledge gap.

4. The method of claim 1, wherein each said sequence of captured actions includes any of reflecting, reviewing, skimming, or speeding.

5. The method of claim 1, wherein said alternate content as appropriate for said particular student is further selected based on historical or utility scores of alternate next modules provided to students with similarities in their user models.

6. The method of claim 1, wherein said student understanding is determined by algorithmic association with correct on first attempt in prior testing.

7. The method of claim 1, wherein said frequency is further calculated using an automated thesaurus so as to aggregate like-meaning terms.

8. The method of claim 1, wherein in the steps of formulating motifs, motif vectors and individual student vectors, intervals greater than a selected length are discounted.

9. The method of claim 1, wherein said particular student's understanding is further based on weighting factors associated with frequency or quantity of student rewinds.

10. The method of claim 1, wherein said step of comparing further includes using at least Multiple EM for Motif Elicitation (MEME) to find similar behaviors between said individual student vector and motif vectors.

11. The method of claim 1, wherein said step of comparing further includes using at least one of cosine similarity and mathematical correlations between student actions and associated times with stored motifs.

12. The method of claim 1, wherein said alternate content is further determined based on at least one instructor directed change to at least one module.

13. The method of claim 1, wherein said processor further comprises a sensor for sensing at least one of movement or sound of a student and any sensing is included as an action.

14. A system for customizing on-line modular delivery of a course comprising:

a processor-based server;

at least one data store; and an interactive student GUI for collecting and forwarding to said server student behaviors together with associated time factors, where said student behaviors comprise at least mouse and keyboard actions;
wherein said at least one data store is used for storing a collection of course module with the frequency of its text terms, a syllabus with the frequency of its text terms, at least one user model, and a collection of known behaviors with associated topical understanding; and
said processor-based server provides course modules to a student selected based on determined student topical material understanding, said understanding based on said user model and a comparison of said student events to said known behaviors, implementing a method of:
with an engine for processing sound, image, and natural language, identifying learning concepts in a module by tagging content words and topics based on word and topic frequencies in each said module, storing said tags in association with a corresponding module and associating said modules with said frequencies and with terms in a course syllabus;
formulating motifs from behavioral data of prior students, each said motif including a sequence of student actions together with associated time, said motifs formed using a probabilistic mixture model wherein each position in a motif is described using a mixture of (1) a position-dependent motif model where each position is described as a multinomial distribution specifying one or more probabilities and (2) a position-independent background model where each position is described as a multinomial distribution specifying character occurrence independent of position, and said formulating further including a maximum likelihood estimation with an expectation-maximization algorithm to maximize the expectation of the joint likelihood of the mixture model;
associating said motifs with said learning concepts using said tags;
further associating said motifs with student understanding by algorithmically extracting similarities between prior user behavioral data and assessments by using collaborative filtering, thereby forming motif vectors;
storing said motifs and motif vectors in said at least one data store;
relative to a particular student delivering a first course module in a sequence of modules, said sequence representing a full course, to said GUI, said first course module retrieved from said at least one data store and including at least one of text, video, and images;
during on-going delivery of said module, said GUI capturing all student actions and associated times, said server receiving said captured student actions relative to said delivered portions of said module and associated times;
formulating an individual student vector for a particular student, said individual student vector initially formed as a user model for said particular student, said individual student vector modified based on the particular student's behavioral data on-goingly as the student progresses in a module, said student behavioral data including actions and associated times;
comparing said individual student vector for said particular student with said motif vectors in said data store to form a predictive understanding of the particular student by forming a file-to-file similarity matrix and using said matrix in a supervised learning algorithm to mathematically determine a best match between said individual student vector and said motif vectors;
based on said best match, selecting alternate content as appropriate for said particular student; and
during on-going module delivery replacing content in a not yet delivered portion of the course with said alternate content in consistency with said best match.

15. The system of claim 14, further comprising a sensor for sensing at least one of movement or sound of a student.

16. The system of claim 14, wherein said step of comparing further includes using at least Multiple EM for Motif Elicitation (MEME) to find similar behaviors between said individual student vector and motif vectors.

17. The system of claim 14, wherein said step of comparing further includes using at least one of cosine similarity and mathematical correlations between student actions and associated times with stored motifs.

18. The system of claim 14, wherein said alternate content is further determined based on at least one instructor directed change to at least one module.

19. The system of claim 14, wherein said particular student's understanding is further based on weighting factors associated with frequency or quantity of student rewinds.

20. The system of claim 14, wherein in the steps of formulating motifs, motif vectors and individual student vectors, intervals greater than a selected length are discounted.

* * * * *